United States Patent
Schwartzentruber et al.

(10) Patent No.: US 8,603,238 B2
(45) Date of Patent: Dec. 10, 2013

(54) CONCRETE WITH A LOW CLINKER CONTENT

(75) Inventors: Arnaud Schwartzentruber, Genas (FR); Myléne Martin, Luzinay (FR); Philippe Benard, Lyons (FR); Serge Sabio, Saint Just Chaleyssin (FR)

(73) Assignee: Lafarge, Paris (FR)

( * ) Notice: Subject to any disclaimer, the term of this patent is extended or adjusted under 35 U.S.C. 154(b) by 97 days.

(21) Appl. No.: 13/258,355

(22) PCT Filed: Mar. 23, 2010

(86) PCT No.: PCT/FR2010/000243
§ 371 (c)(1),
(2), (4) Date: Sep. 21, 2011

(87) PCT Pub. No.: WO2010/112687
PCT Pub. Date: Oct. 7, 2010

(65) Prior Publication Data
US 2012/0024198 A1 Feb. 2, 2012

(30) Foreign Application Priority Data
Mar. 24, 2009 (FR) ...................................... 09 01364

(51) Int. Cl.
*C04B 14/04* (2006.01)
*C04B 14/10* (2006.01)
*C04B 18/06* (2006.01)

(52) U.S. Cl.
USPC ........................................................ 106/705

(58) Field of Classification Search
USPC ......................................... 106/705, 716, 718
See application file for complete search history.

(56) References Cited

U.S. PATENT DOCUMENTS

| 4,240,952 A | 12/1980 | Hulbert, Jr. et al. |
| 4,313,763 A | 2/1982 | Turpin, Jr. |
| 4,640,715 A | 2/1987 | Heitzmann et al. |
| 4,842,649 A | 6/1989 | Heitzmann et al. |

(Continued)

FOREIGN PATENT DOCUMENTS

| CN | 1245787 A | 3/2000 |
| EP | 0 042 935 B1 | 10/1988 |

(Continued)

OTHER PUBLICATIONS

International Search Report for PCT/FR2010/000243.

(Continued)

*Primary Examiner* — Paul Marcantoni
(74) *Attorney, Agent, or Firm* — Pillsbury Winthrop Shaw Pittman LLP (57) ABSTRACT

A dry binder premix includes, in mass proportions: Portland clinker having a Blaine specific surface area comprised from 4500 to 9500 cm²/g, the minimum quantity of the clinker by mass percentage relative to the total mass of the premix being determined according to: $[-6.10^{-3} \times BSS_k]+75$, in which $BSS_k$ is the Blaine specific surface area of the clinker given in cm²/g; fly ash; an alkali sulphate; one source of $SO_3$; complementary materials having a Dv90 less than or equal to 200 μm selected from limestone powders, calcined shale, metakaolins, siliceous fillers, silica powders, pozzolans, slags, fly ash and mixtures thereof. A quantity of clinker+the quantity of fly ash is greater than or equal to 75% by mass percentage relative to the total mass of the premix and a total quantity of clinker in the premix is less than 60% by mass percentage relative to the total mass of the premix.

18 Claims, 1 Drawing Sheet

(56) References Cited

U.S. PATENT DOCUMENTS

| | | |
|---|---|---|
| 5,374,308 A | 12/1994 | Kirkpatrick et al. |
| 5,435,843 A | 7/1995 | Roy et al. |
| 6,036,768 A | 3/2000 | Edlinger et al. |
| 6,682,595 B1 | 1/2004 | Barbour |

FOREIGN PATENT DOCUMENTS

| | | | |
|---|---|---|---|
| EP | 0 990 627 A1 | 4/2000 | |
| FR | 2 590 248 A1 | 5/1987 | |
| FR | 2 883 281 A1 | 9/2006 | |
| JP | 2009-035429 | 2/2009 | |
| WO | WO 90/13524 | 11/1990 | |
| WO | WO 98/51640 | 11/1998 | |
| WO | WO 2005/097700 A2 | 10/2005 | |
| WO | WO 2006/032785 A2 | 3/2006 | |
| WO | WO 2006/032786 A2 | 3/2006 | |
| WO | WO 2007/096686 A1 | 8/2007 | |
| WO | WO 2007/132098 A1 | 11/2007 | |
| WO | WO 2009/024829 A1 | 2/2009 | |

OTHER PUBLICATIONS

Shi et al.; "What is the most efficient way to activate the reactivity of fly ashes"; $2^{nd}$ Material Specialty Conference of Canadian Society for Civil Engineering, Montréal, Québec, Canada, Jun. 5-8, 2002; pp. 1-10.

CONCRETE WITH A LOW CLINKER CONTENT

CROSS-REFERENCE TO RELATED APPLICATIONS

This is the U.S. National Stage of PCT/FR2010/000243, filed Mar. 23, 2010, which in turn claims priority to French patent application Ser. No. 09/01364, filed Mar. 24, 2009, the entire contents of all applications are incorporated herein by reference in their entireties.

FIELD OF THE INVENTION

The invention relates to a concrete with a low clinker content, as well as processes for the preparation of such a concrete and compositions useful for the implementation of these processes.

TECHNICAL BACKGROUND

In the field of ordinary structural concretes, in particular concretes of the C25/30 type (that is to say, for which the typical compressive strength 28 days after mixing, measured on a 16×32 cm cylinder is at least 25 MPa, and measured on a 15×15 cm cube is at least 30 MPa according to the EN 206-1 Standard), or in the case of the C20/25 type of concretes (whose characteristic compressive strength 28 days after mixing, measured on a 16×32 cm cylinder is at least 20 MPa, and measured on a 15×15 cm cube is at least 25 MPa according to the EN 206-1 Standard) it has been noted that the quantity of cement is typically from 260 to 360 kg per m$^3$ of concrete. Current European standards moreover do not provide levels of cement less than 260 kg/m$^3$ for ordinary structural concretes.

Now, the processes for cement production, and more particularly its essential constituent, clinker, are responsible for high emissions of carbon dioxide. The production of grains of clinker in fact requires:

a) pre-heating and decarbonation of the raw meal which is obtained by grinding the raw materials, which are, in particular, limestone and clay; and b) firing or clinkering the meal at a temperature of 1450-1550° C., followed by rapid cooling.

These two stages produce $CO_2$, on the one hand as a direct product of the decarbonation and on the other hand as a by-product of the combustion which is implemented in the firing stage in order to raise the temperature.

The emission level reaches approximately 560 kg of $CO_2$ per tonne of binder for a binder typically used to produce a C25/30 concrete, which contains 65% of clinker (on the basis of an average emission of 850 kg of $CO_2$ per tonne of clinker).

Now, the high emissions of carbon dioxide in standard processes for the production of cement and concrete compositions constitute a major environmental problem, and, in the current context, are subject to high economic penalties.

A strong need therefore exists for a process capable of producing concrete with reduced associated emissions of carbon dioxide, the said concrete providing satisfactory mechanical properties, and in particular a C20/25 or C25/30 type of concrete.

Advantageously, the concrete according to the invention has an arithmetic average of compressive strengths greater than or equal to 6 MPa, preferably greater than or equal to 7 MPa, at 20° C. 24 hours after mixing, the measurement being carried out according to the EN 12390-3 Standard on cylindrical specimens, kept according to the EN 12390-2 Standard at 20° C.±2° C. and relative humidity greater than 95%.

Advantageously the rheological properties of the wet concrete are satisfactory and provide good workability, which is to say that the consistency of the mixed batch is suitable for easy handling, even two hours after mixing.

SUMMARY OF THE INVENTION

The invention therefore relates to a dry binder premix comprising, in mass proportions:

Portland clinker having a Blaine specific surface area comprised from 4500 to 9500 cm$^2$/g, preferably from 5500 to 8000 cm$^2$/g, the minimum quantity of the said clinker by mass percentage relative to the total mass of the premix being determined according to the following formula (I):

$$[-6.10^{-3} \times BSS_k] + 75 \qquad \text{Formula (I)}$$

in which $BSS_k$ is the Blaine specific surface area of the clinker given in cm$^2$/g;

fly ash;

at least one alkali sulphate, the quantity of alkali sulphate being such that the quantity of equivalent $Na_2O$ in the premix is greater than or equal to 5% by mass percentage relative to the mass of fly ash;

at least one source of $SO_3$, in a quantity such that the quantity of $SO_3$ in the premix is greater than or equal to 2% by mass percentage relative to the mass of Portland clinker;

complementary materials having a Dv90 less than or equal to 200 μm selected from limestone powders, calcined shale, metakaolins, siliceous fillers, silica powders, pozzolans, slags, fly ash and mixtures thereof;

the quantity of clinker+the quantity of fly ash being greater than or equal to 75%, preferably 78%, by mass percentage relative to the total mass of the premix;

the total quantity of clinker in the premix being strictly less than 60% by mass percentage relative to the total mass of the premix.

Preferably, the premix according to the invention further comprises a least one source of calcium.

Preferably, the alkali sulphate of the premix according to the invention is selected from sodium sulphate, potassium sulphate, lithium sulphate and mixtures thereof. Preferably, the alkali sulphate of the premix according to the invention is sodium sulphate.

Preferably, the source of calcium of the premix according to the invention is selected from calcium salts and mixtures thereof.

According to an embodiment, the premix according to the invention also comprises from 0.05 to 1.5%, preferably from 0.1 to 0.8%, by mass percentage, of a plasticizer, preferably of the polycarboxylate type.

According to an embodiment, the complementary materials represent an inert charge. According to an embodiment of the invention, the complementary materials are limestone powders.

According to an embodiment of the invention, the premix according to the invention further comprises an accelerator and/or an air-entraining agent and/or a thickening agent and/or a retarder and/or a clay-inerting agent and/or a plasticizer or mixtures thereof.

The invention also relates to a dry binder mix comprising, in mass proportions relative to the total mass of the mix:

at least 10% of the above-mentioned premix; and up to 90% of aggregates.

According to an embodiment of the dry binder mix according to the invention, the aggregates comprise sand and gravel, the mass ratio of the quantity of sand to the quantity of gravel being from 1.5/1 to 1/1.8, preferably from 1.25/1 to 1/1.4, more preferably from 1.2/1 to 1/1.2.

The invention also relates to a wet concrete composition, comprising from 140 to 220 l/m³ of effective water in association with:
- at least 10% of the above-mentioned premix; and
- up to 90% of aggregates;

the mass percentages being given relative to the total dry mass of the composition.

According to an embodiment, the aggregates comprise sand and gravel, the mass ratio of the quantity of sand to the quantity of gravel being from 1.5/1 to 1/1.8, preferably from 1.25/1 to 1/1.4, more preferably from 1.2/1 to 1/1.2.

According to an embodiment of the wet concrete composition according to the invention, the quantity of effective water used varies from 140 to 200 l/m³, preferably from 150 to 180 l/m³ (see the EN 206-1 Standard, paragraph 3.1.30).

According to an embodiment, the wet concrete composition according to the invention is a threshold concrete.

According to an embodiment, the wet concrete composition according to the invention has an arithmetic average of compressive strengths greater than or equal to 6 MPa, at 20° C. 24 hours after mixing.

According to another embodiment, the wet concrete composition according to the invention has a characteristic compressive strength greater than or equal to 25 MPa, 28 days after mixing.

According to another second embodiment, the wet concrete composition according to the invention has a characteristic compressive strength greater than or equal to 20 MPa, 28 days after mixing. According to a third embodiment, the wet concrete composition according to the invention has an arithmetic average of compressive strengths greater than or equal to 25 MPa, at 20° C. 28 days after mixing.

According to a fourth embodiment, the wet concrete composition according to the invention has an arithmetic average of compressive strengths greater than or equal to 30 MPa, at 20° C. 28 days after mixing.

According to an embodiment, the wet concrete composition according to the invention has a spread from 180 to 270 mm, preferably from 215 to 235 mm, using the ASTM C230 standard cone, after a period of one minute and 45 seconds, of which 30 seconds are in the presence of vibrations of 50 Hz frequency and 0.5 mm amplitude.

According to an embodiment of the wet concrete composition according to the invention, the slump using the Abrams cone (or slump value) is comprised from 0 to 250 mm, preferably from 100 to 240 mm.

The invention also relates to a hardened concrete object of the above-mentioned composition.

The invention also relates to a process for the preparation of a wet concrete composition comprising a step of:
- mixing the above-mentioned mix with 140 to 220 l/m³ of effective water; or
- mixing the above-mentioned pre-mix with aggregates and 140 to 220 l/m³ of effective water.

According to a variant of the process for preparation of a wet concrete composition according to the invention, the mixing is moreover done in the presence of calcium sulphate.

The invention also relates to a process for the preparation of a wet concrete composition comprising a step of mixing:
- Portland clinker having a Blaine specific surface area comprised from 4500 to 9500 cm²/g, preferably from 5500 to 8000 cm²/g, the minimum quantity of the said clinker, in kg/m³, being determined according to the following formula (II):

$$[(0.021 \times BSS_k) + 230] \times (W_{e\!f\!f} + 140) \qquad \text{Formula (II)}$$

in which $BSS_k$ is the Blaine specific surface area of the clinker given in cm²/g, $W_{e\!f\!f}$ is the quantity of effective water in l/m³;
- fly ash;
- at least one alkali sulphate, the quantity of alkali sulphate being such that the quantity of equivalent $Na_2O$ in the binder is greater than or equal to 5% by mass percentage relative to the mass of fly ash;
- at least one source of $SO_3$, in a quantity such that the quantity of $SO_3$ in the binder is greater than or equal to 2% by mass percentage relative to the mass of Portland clinker;
- complementary materials having a Dv90 less than or equal to 200 μm selected from limestone powders, calcined shale, metakaolins, siliceous fillers, silica powders, pozzolans, slags, fly ash and mixtures thereof, the minimum quantity of which, in kg/m³, is determined according to the following formula (III):

the sum of (quantity of complementary material)+(quantity of fly ash)+(quantity of clinker)+(quantity of alkali sulphate)+(quantity of a source of $SO_3$) is greater than or equal to 220 kg/m³ of concrete    Formula (III);

- from 1500 to 2200 kg/m³, preferably from 1700 to 2000 kg/m³ of aggregates;
- a plasticizer;
- optionally an accelerator and/or an air-entraining agent and/or a thickening agent and/or a retarder and/or a clay-inerting agent; with
- 140 to 220/m³ of effective water, the total quantity of clinker in the wet concrete being less than or equal to 200 kg/m³;

the quantity of clinker+the quantity of fly ash being greater than or equal to 240 kg/m³.

According to an embodiment of the process for the preparation of a wet concrete composition, the clinker and/or fly ash and/or complementary materials are as defined hereinabove relative to the premix.

According to an embodiment of the process for preparation of a wet concrete composition, the quantity of effective water used varies from 140 to 200 l/m³, preferably from 150 to 180 l/m³.

The invention also relates to a process for preparation of a cast wet concrete composition, comprising a step of:
- casting a wet concrete composition as defined hereinabove or a wet concrete composition obtained according to the process described hereinabove.

The invention also relates to a process for the production of a concrete object, comprising a step of:
- hardening of a wet concrete composition as defined hereinabove or of a cast wet concrete composition as defined hereinabove or of a wet concrete composition obtained according to the process described hereinabove.

The invention also relates to the use of at least one alkali sulphate and optionally at least one source of calcium to activate the fly ash in a premix according to the invention, in a mix according to the invention, in a wet concrete composition according to the invention or in one of the processes according to the invention.

The invention makes it possible to respond to the need to reduce $CO_2$ emissions hitherto unsatisfied by known concretes. Indeed, the quantity of cement (and in particular of clinker) used within the scope of the present invention is less than that which is conventionally necessary. More precisely, the induced emission of $CO_2$ can be reduced by the order of 50 to 60% whilst providing concretes of the C25/30 or C20/25 type. Moreover, the rheology of wet concrete compositions remains of the same order as those of compositions of standard concretes. Furthermore, the invention makes it possible, despite a very low content of clinker, to retain early-age strengths of the same order of magnitude as those obtained using a formulation with a standard content of clinker.

The concrete obtained according to the invention also has the following advantages:

the cost of the dry binder premixes according to the invention can be typically less by 7 to 10% than the cost of dry binder premixes used to prepare a typical C25/30 or C20/25 concrete.

The various specific aims and advantages and embodiments of the invention are obtained by means of in-depth optimisation of all the formulation parameters, and in particular by means of:

optimisation of the particle packing of the different materials (allowing for a minimisation of the quantity of water for a given rheological behaviour);

optimisation of the mix's topology, that is to say, the multiplication and the homogeneity in space of the adhesion interfaces between particles of sand and/or aggregates by <<glue points>> of cement hydrates (in particular via the use of clinker grains approximately 10 times finer than those of ordinary Portland cement);

the search for a <<chrono-formulation>>, that is to say, the use of a minimum quantity of clinker to ensure the acquisition of short-term mechanical strength, while other binding materials are present in a quantity adjusted to provide the more long-term acquisition of mechanical strength (acting to a certain extent as a relay for the clinker in the increase of the mechanical strength);

adjustment of the total water demand by a choice of materials with a relatively low total water demand (in particular low porosity), which also makes it possible to maximise the compressive strength;

optimisation of the different admixtures and in particular the plasticizer (superplasticizer), which makes it possible to maximise the reduction of water by optimisation of the dispersion of the powder and hence the packing.

DESCRIPTION OF THE EMBODIMENTS OF THE INVENTION

The invention is now described in more detail and in a non-restrictive manner in the following description.

Clinker:

<<Clinker>> is understood according to the present invention as a Portland clinker as defined in the EN 197-1 Standard, paragraph 5.2.1.

The Portland clinker can be obtained from standard Portland cements, and in particular from among the cements described in the EN 197-1 European Standard. It is possible for example to use a CEM I or CEM II 52.5 N or R or PM (marine construction—NF P 15-317 Standard) cement or PMES cement (marine construction, sulphated water—NF P 15-319 Standard). The cement may be of the H.I.S. type (High Initial Strength).

In certain cases, in particular for the CEM II type, the Portland cement is not constituted of pure clinker. The CEM II type of Portland cement comprises clinker mixed with at least one additional material (pozzolan, fly ash, calcined shale, limestone, . . . ) in quantity up to 37% by mass. Therefore, if the clinker used comes from such a cement, the additional material(s) are counted either among the fly ash, or among the above-mentioned <<complementary materials>> (if they are materials in the form of grains with a Dv90 less than or equal to 200 µm, and preferably a Dv97 less than or equal to 200 µm).

Such a cement may be ground and/or cut (by pneumatic classification) in order to provide clinker with the required characteristics according to the invention, that is, a Blaine specific surface area comprised from 4500 to 9500 $cm^2/g$, preferably from 5500 to 8000 $cm^2/g$ according to the EN 196-6 Standard, paragraph 4.

The clinker may be described as ultrafine clinker. The cement may for example be ground using a grinding plant comprising a primary grinder of the grinding or vertical type coupled with a finishing mill of the Horomill© type, a pendular or a ball mill or an air-jet mill type. It is also possible to use a second, third generation or a very-high-efficiency pneumatic selector or classifier.

The intention is, by reducing the size of the clinker, to maximise the diffusion distances of the grains of cement in order to maximise the homogeneity of the matrix by means of an optimum distribution of the inter-particle glue points.

Fly Ash:

The fly ash is as defined in the NF EN 197-1 Standard, paragraph 5.2.4 or the ASTM C618 Standard.

According to a variant of the invention, the fly ash may be partially replaced by slag.

According to another variant of the invention, the fly ash may be partially or completely replaced by silica fume.

According to the two above variants, the slag or the silica fume must be counted in the binder for the different calculations.

Alkali Sulphate:

The alkali sulphate is preferably selected from sodium sulphate ($Na_2SO_4$), potassium sulphate ($K_2SO_4$), lithium sulphate ($Li_2SO_4$), sodium bisulfate ($NaHSO_4$), potassium bisulfate ($KHSO_4$), lithium bisulfate ($LiHSO_4$) and mixtures thereof. Preferably, the alkali sulphate is selected from sodium sulphate, potassium sulphate, lithium sulphate and mixtures thereof. Even more preferably, the alkali sulphate is sodium sulphate.

The alkali sulphate may be used in various forms, and in particular in the form of powder or liquid. The use of the alkali sulphate in the powder form seems to be particularly appropriate for the premix according to the invention and the dry binder mix according to the invention. In contrast, the use of the alkali sulphate in the liquid form seems particularly appropriate for the wet concrete composition according to the invention and the process used to obtain it.

The formula to determine the quantity of equivalent $Na_2O$ in the binder according to the invention (clinker+fly ash+alkali sulphate+source of $SO_3$+optionally source of calcium+complementary materials) by mass percentage is the following formula (IV):

$$\text{equivalent } Na_2O_{(binder)} = [Na_2O] + 0.658 \times [K_2O] + 2.081 \times [Li_2O] \quad \text{Formula (IV)}$$

in which $[Na_2O]$, $[K_2O]$ and $[Li_2O]$ are the mass percentages of $Na_2O$, $K_2O$ and $Li_2O$ in the binder (clinker+fly ash+alkali sulphate+source of $SO_3$+complementary materials+optionally source of calcium). The mass percentages of $Na_2O$, $K_2O$ and $Li_2O$ in the binder may be determined for example by x-ray fluorescence from the quantity of Na, K and Li present in the binder. When knowing the equivalent $Na_2O_{(binder)}$ value, it suffices to multiply this value by the mass of the binder and divide it by the mass of fly ash to obtain the equivalent $Na_2O$ value relative to the mass of fly ash.

The quantity of equivalent $Na_2O$ in the binder according to the invention is preferably greater than or equal to 7%, preferably greater than or equal to 9%, by mass percentage relative to the mass of fly ash.

Source of Calcium:

The source of calcium is selected from calcium salts and mixtures thereof. Preferably the calcium salts are selected from bromides, chlorides, formates, oxides, hydroxides, nitrates, nitrites, sulphates and mixtures thereof. Preferably the source of calcium is calcium sulphate, calcium dihydroxide, calcium chloride, calcium bromide or mixtures thereof. Preferably, the source of calcium is calcium sulphate.

The calcium dihydroxides may preferably be lime, Portlandite or mixtures thereof. The calcium sulphates may preferably be gypsum, hemi-hydrate, anhydrite or mixtures thereof.

The source of calcium may be used in various forms, and in particular in the form of powder or liquid. The use of the source of calcium in the powder form seems to be particularly appropriate for the premix according to the invention and the dry binder mix according to the invention. In contrast, the use of the source of calcium in the liquid form seems particularly appropriate for the wet concrete composition according to the invention and the process used to obtain it.

The alkali sulphate and the source of calcium may be particularly useful to activate the fly ash. This activation may make it possible to obtain target mechanical strengths, both 24 hours after mixing and 28 days after mixing.

$SO_3$:

The $SO_3$ may be provided by the different constituents of the compositions according to the invention (premix, dry binder mix or wet concrete) but also by the calcium sulphate typically used to add sulphate to the clinker (see the EN 197-1 Standard, paragraph 5.4.).

The calcium sulphate may in particular be selected from gypsum, hemihydrate, anhydrite or mixtures thereof. Calcium sulphate may exist in its natural state or may come from industry in the form of a by-product of certain industrial processes.

According to a variant of the invention, the quantity of calcium sulphate may for example be adjusted in a conventional manner in order to be at the optimum of the mechanical compressive strength at 24 hours and at 20° C. Preferably, the quantity of calcium sulphate, determined according to the method described in the EN 196-2 Standard, paragraph 8, is from 2.0 to 3.5%, by mass percentage of sulphate ($SO_3$) relative to the mass of the mix (clinker+fly ash+alkali sulphate+complementary materials+calcium sulphate).

The quantity of $SO_3$ may for example be determined according to the method described in the EN 196-2 Standard, paragraph 8.

Complementary Materials:

<<Complementary materials>> are understood as materials in the form of grains with a Dv90 less than or equal to 200 µm, and preferably a Dv97 less than or equal to 200 µm.

These materials may be used as filling materials of the matrix, that is to say that they fill in the gaps between the other materials whose grains are larger in size.

The nature of the complementary materials is not an essential element of the present invention, inasmuch as this criterion does not influence (in particular, negatively) the result to be reached in terms of mechanical strengths. Therefore, it would be possible to add different types of complementary materials, for example those listed herein below, without compromising the strengths of the obtained concretes at 28 days or at 24 hours. In particular, an inert complementary material would be the most unfavourable case from the viewpoint of the mechanical strengths. Consequently, a non-inert complementary material would make it possible to improve the mechanical strengths of the obtained concrete, whether at 24 hours or at 28 days compared to a same formulation according to the invention comprising an inert complementary material.

Even though it is possible to envisage that the complementary materials may be binder materials, optimisation (in particular in terms of cost) for concretes according to the invention leads to a preference for the complementary materials to be an inert filler, that is, non-binding materials (with no hydraulic or pozzolanic activity).

It will be possible for example to use as complementary materials limestone powders (limestone fillers). It will also be possible to use calcined shale, metakaolins, siliceous fillers or silica powders, pozzolans, slag, fly ash or mixtures thereof. Preferably, the complementary materials are those described in the EN 197-1 Standard in paragraphs 5.2.2 to 5.2.7. Preferably, the complementary materials are limestone powders.

The Dv97 (by volume) corresponds to the $97^{th}$ percentile of the particle size distribution, that is to say that 97% of the particles have a size smaller than the Dv97 and 3% have a size larger than the Dv97. Likewise, the Dv90 corresponds to the $90^{th}$ percentile of the particle size distribution, that is to say that 90% of the particles have a size smaller than the Dv90 and 10% have a size larger than the Dv90. Likewise, the Dv50 corresponds to the $50^{th}$ percentile of the particle size distribution, that is to say that 50% of the particles have a size smaller than the Dv50 and 50% have a size larger than the Dv50.

Generally, the Dv50, the Dv90, the Dv97 and the other values of the same type, which are characteristic of the granulometric profile (volume distribution) of a collection of particles or grains may be determined by laser granulometry for the particle sizes smaller than 200 µm, or by sieving for the particle sizes larger than 200 µm.

Nevertheless, when individual particles have a tendency to aggregate, it is preferable to determine their size by electron microscopy, given that the apparent size measured by laser diffraction granulometry is then bigger than the real particle size, which is liable to falsify the interpretation (agglomeration and flocculation).

Water:

Concrete comprises different categories of water. First of all, the effective water is the concrete's internal water, located between the grains of the solid skeleton formed by the aggregates, the clinker, the slag and the complementary materials. The effective water therefore represents the water necessary for hydration and to obtain consistency and mechanical strengths. On the other hand, concrete comprises water retained by the porosity of the aggregates, the fly ash and the complementary materials. This water is not taken into account in the effective water. It is assumed to be imprisoned and does not participate in the hydration of the cement or to obtain consistency. The total water represents all the water in the mix (at the time of the mixing).

The effective water is a standardized notion and its calculation mode is presented in the EN 206-1 Standard, page 17, paragraph 3.1.30. The level of effective water is the difference between the quantity of total water contained in the fresh concrete and the quantity of absorbable water by the aggregates, given that the quantity of absorbable water is deducted from the absorption coefficient of the aggregates which is measured according to the NF EN 1097-6 Standard, page 5, paragraph 3.6 and the associated Appendix B.

Dry Binder Premixes:

The dry binder premix according to the invention comprises, in mass proportions:

Portland clinker having a Blaine specific surface area comprised from 4500 to 9500 cm²/g, preferably from 5500 to 8000 cm²/g, the minimum quantity of the said clinker by mass percentage relative to the total mass of the premix being determined according to the following formula (I):

$$[-6.10^{-3} \times BSS_k] + 75 \qquad \text{Formula (I)}$$

in which $BSS_k$ is the Blaine specific surface area of the clinker given in cm²/g;

fly ash;

at least one alkali sulphate, the quantity of alkali sulphate being such that The quantity of equivalent $Na_2O$ in the premix is greater than or equal to 5% by mass percentage relative to the mass of fly ash;

at least one source of $SO_3$, in a quantity such that the quantity of $SO_3$ in the premix is greater than or equal to 2% by mass percentage relative to the mass of Portland clinker;

complementary materials having a Dv90 less than or equal to 200 µm selected from limestone powders, calcined shale, metakaolins, siliceous fillers, silica powders, pozzolans, slags, fly ash and mixtures thereof;

the quantity of clinker+the quantity of fly ash being greater than or equal to 75%, preferably 78%, by mass percentage relative to the total mass of the premix;

the total quantity of clinker in the premix being strictly less than 60% by mass percentage relative to the total mass of the premix.

Preferably, the minimum quantity of the said clinker by mass percentage relative to the total mass of the premix is determined according to formula (I bis):

$$[-6.10^{-3} \times BSS_k] + 80 \qquad \text{Formula (I bis)}$$

in which $BSS_k$ is the Blaine specific surface area of the clinker given in cm²/g.

Formulae (I) and (I bis) herein above, as well as Formulae (II), (II bis) and (II ter) described herein below, were obtained by an experimental approach, that is to say, by varying several parameters (in particular the quantity of clinker, the Blaine specific surface area of the clinker and the quantity of effective water) and by looking for an empirical relation between these different parameters. The thus obtained formulae are therefore empirical laws, that is <<laws which appear to verify experimental occurrences, which can be stated but without theoretically proving them>>. This definition comes from the website http://fr.wikipedia.org/wiki/Loi_empirique. (see also *The problem of the discovery of an empirical law*, A. A. Petrosjan, Voprosy Filosofii Moskva, 1983, no 12, pages 71-79). Therefore, the different units are balanced by the constant values in the formulae. The value of the constants in the formulae is adjusted using for example the method of least squares, well known to the person skilled in the art to minimize the error between experimental data and the given equation (see for example the internet website of Dec Formations: www.decformations.com/mathematiques/moindres_carres.php, or the book *Méthodes statistiques Volume 2—Méthodes d'analyse de régression linéaire simple et de régression multiple—Analyse de corrélation linéaire simple*, Gérald Baillargeon, Editions SMG).

Consequently, formulae (I), (I bis), (II), (II bis) and (II ter) may be used by simply replacing the Blaine specific surface area of the clinker and the quantity of effective water given in the units specified in the description (cm²/g or l/m³). An example of calculation of formula (II) is given the next part of the description.

The percentage of authorised deviation from the results of Formulae (I), (I bis), (II), (II bis) and (II ter) is +/−5%.

Preferably, the minimum quantity of clinker in the premix according to the invention may be obtained using the table herein below, according to the Blaine specific surface area of the clinker (in replacement of use of Formulae (I) and (I bis)):

| $BSS_k$ (cm²/g) | Minimum quantity of clinker (mass %) | Preferred minimum quantity of clinker (mass %) |
|---|---|---|
| 4500 | 48 | 53 |
| 4600 | 47.4 | 52.4 |
| 4700 | 46.8 | 51.8 |
| 4800 | 46.2 | 51.2 |
| 4900 | 45.6 | 50.6 |
| 5000 | 45 | 50 |
| 5100 | 44.4 | 49.4 |
| 5200 | 43.8 | 48.8 |
| 5300 | 43.2 | 48.2 |
| 5400 | 42.6 | 47.6 |
| 5500 | 42 | 47 |
| 5600 | 41.4 | 46.4 |
| 5700 | 40.8 | 45.8 |
| 5800 | 40.2 | 45.2 |
| 5900 | 39.6 | 44.6 |
| 6000 | 39 | 44 |
| 6100 | 38.4 | 43.4 |
| 6200 | 37.8 | 42.8 |
| 6300 | 37.2 | 42.2 |
| 6400 | 36.6 | 41.6 |
| 6500 | 36 | 41 |
| 6600 | 35.4 | 40.4 |
| 6700 | 34.8 | 39.8 |
| 6800 | 34.2 | 39.2 |
| 6900 | 33.6 | 38.6 |
| 7000 | 33 | 38 |
| 7100 | 32.4 | 37.4 |
| 7200 | 31.8 | 36.8 |
| 7300 | 31.2 | 36.2 |
| 7400 | 30.6 | 35.6 |
| 7500 | 30 | 35 |
| 7600 | 29.4 | 34.4 |
| 7700 | 28.8 | 33.8 |
| 7800 | 28.2 | 33.2 |
| 7900 | 27.6 | 32.6 |
| 8000 | 27 | 32 |
| 8100 | 26.4 | 31.4 |
| 8200 | 25.8 | 30.8 |
| 8300 | 25.2 | 30.2 |
| 8400 | 24.6 | 29.6 |
| 8500 | 24 | 29 |
| 8600 | 23.4 | 28.4 |
| 8700 | 22.8 | 27.8 |
| 8800 | 22.2 | 27.2 |
| 8900 | 21.6 | 26.6 |
| 9000 | 21 | 26 |
| 9100 | 20.4 | 25.4 |
| 9200 | 19.8 | 24.8 |
| 9300 | 19.2 | 24.2 |
| 9400 | 18.6 | 23.6 |
| 9500 | 18 | 23 |

Preferably, the complementary materials are limestone powders.

Preferably, the premix according to the invention further comprises calcium sulphate.

The clinker, slag and complementary materials may preferably be combined according to the proportions given herein above to form dry binder premixes (free of added water), intended to be mixed with aggregates and water.

Preferably, one or more admixtures typically used in the art may also be envisaged in these dry binder premixes: an accelerator and/or an air-entraining agent and/or a thickening agent and/or a retarder and/or a clay inerting agent and/or a plasticizer. In particular, it may be useful to include a plasticizer (superplasticizer), in particular the polycarboxylate type, in particular from 0.05 to 1.5%, preferably from 0.1 to 0.8%, by mass percentage.

<<Clay-inerting agent>> is understood as all molecules capable of reducing or cancelling the detrimental effect of clays on the properties of hydraulic binders. In particular it is possible to use clay-inerting agents such as those described in the International Patent Applications WO 2006/032785 and WO 2006/032786 documents.

Aggregates:

The aggregates are of the natural type as defined in the XPP18-545 Standard, given that the aggregates have a maximum size Dmax less than or equal to 32 mm. The aggregates comprise sand (grains with a maximum size Dmax less than 4 mm, as defined in the EN 12620 Standard), and/or gravel (aggregates with a minimal size Dmin greater than or equal to 2 mm, as defined in the EN 12620 Standard).

The aggregates may be of a limestone, siliceous or silica-limestone nature.

The sand and gravel may be river or crushed. A crushed sand comprises a greater proportion of fines than a river sand. According to the vocabulary used in the field of sand, fines are grains with a size less than 63 μm (passing through a sieve).

When the sand comprises fines in a quantity in excess of 1% (mass fraction of the sand), it is necessary to take into account the quantity of fines supplied by the sand, by reducing the quantity of <<complementary materials>> described hereinabove by a quantity equal to the quantity of fines present in the sand (fraction less than 63 μm) beyond the threshold of 1%.

Preferably, the clay content in the sand and the aggregates is less than 1%. High clay contents indeed have a negative effect on concrete workability.

Preferably the mass ratio of the quantity of sand to the quantity of gravel is comprised from 1.5/1 to 1/1.8, more particularly from 1.25/1 to 1/1.4, in particular from 1.2/1 to 1/1.2, and ideally is equal or close to 1/1.

Dry Binder Mixes:

The aggregates, the clinker, the fly ash, the complementary materials, the alkali sulphates, the optional admixtures (in particular a plasticizer) may be combined in dry binder mixes (free of added water). Such dry binder mixes may be prepared either by mixing an above-defined premix with the aggregates, or by mixing directly the different constituents ab initio.

The mass proportions relative to the total mass of the mix of the different constituents may then be defined as follows:
at least 10% of the above-mentioned premix; and
up to 90% of aggregates.

Preferably, the complementary materials are limestone powders.

Preferably, the dry binder mix according to the invention further comprises calcium sulphate.

A dry binder mix thus defined is a dry ready-mix concrete, usable by simply mixing with water.

According to a variant of the dry binder mix according to the invention, the mass proportions relative to the total mass of the mix of the different constituents may be defined as follows:
at least 10% of the above-mentioned premix; and
up to 90% of gravel.

Preferably, the complementary materials are limestone powders.

Preferably, the dry binder mix according to the invention further comprises calcium sulphate.

According to a variant of the dry binder mix according to the invention, the mass proportions relative to the total mass of the mix of the different constituents may be defined as follows:
at least 10% of the above-mentioned premix; and
up to 90% of sand.

Preferably, the complementary materials are limestone powders.

Preferably, the dry binder mix according to the invention further comprises calcium sulphate.

Concrete:

<<Wet concrete>> is understood according to the invention as fresh concrete (see the EN 206-1 Standard, paragraph 3.1.2).

The wet concrete according to the invention is prepared by mixing:
at least 10% of the above-mentioned premix; and
up to 90% of aggregates;
with 140 to 220 l/m³ of effective water.

The mass percentages being given relative to the total dry mass of the concrete.

Preferably, the complementary materials are limestone powders.

Preferably, the wet concrete according to the invention further comprises calcium sulphate.

The wet concrete may also be prepared directly by mixing the above-defined dry mix with 140 to 220 l/m³ of effective water.

The concrete according to the invention may also be prepared by mixing directly the different ingredients together and with water. The process for the preparation of a wet concrete composition according to the invention comprises a step of mixing:

Portland clinker having a Blaine specific surface area comprised from 4500 to 9500 cm²/g, preferably from 5500 to 8000 cm²/g, the minimum quantity of the said clinker, in kg/m³, being determined according to the following formula (II):

$$[(-0.021 \times BSS_k) + 230] \times (W_{\mathit{eff}} + 140)$$  Formula (II)

in which $BSS_k$ is the Blaine specific surface area of the clinker given in cm²/g, $W_{\mathit{eff}}$ is the quantity of effective water in l/m³;

fly ash;

at least one alkali sulphate, the quantity of alkali sulphate being such that the quantity of equivalent $Na_2O$ in the binder is greater than or equal to 5% by mass percentage relative to the mass of fly ash;

at least one source of $SO_3$, in a quantity such that the quantity of $SO_3$ in the binder is greater than or equal to 2% by mass percentage relative to the mass of Portland clinker;

complementary materials having a Dv90 less than or equal to 200 μm selected from limestone powders, calcined shale, metakaolins, siliceous fillers, silica powders, pozzolans, slags, fly ash and mixtures thereof, the minimum quantity of which, in kg/m³, is determined according to the following formula (III):

the sum of(quantity of complementary material)+
(quantity of fly ash)+(quantity of clinker)+(quantity of alkali sulphate)+(quantity of a source of $SO_3$)is greater than or equal to 220 kg/m³ of concrete  Formula (III);

from 1500 to 2200 kg/m³, preferably from 1700 to 2000 kg/m³ of aggregates;
a plasticizer;
optionally an accelerator and/or an air-entraining agent and/or a thickening agent and/or a retarder and/or a clay-inerting agent; with
140 to 220/m³ of effective water,
the total quantity of clinker in the wet concrete being less than or equal to 200 kg/m³;
the quantity of clinker+the quantity of fly ash being greater than or equal to 240 kg/m³.

Preferably, the complementary materials are limestone powders.

Preferably, the minimum quantity of the said clinker in kg/m³ is determined according to the following formula (II bis):

$$[(-0.021 \times BSS_k) + 250] \times (W_{eff} \div 140) \quad \text{Formula (II bis)}$$

in which $BSS_k$ is the Blaine specific surface area of the clinker given in cm²/g,
$W_{eff}$ is the quantity of effective water in l/m³.

Preferably, the minimum quantity of the said clinker in kg/m³ is determined according to the following formula (II ter):

$$[(-0.021 \times BSS_k) + 270] \times (W_{eff} \div 140) \quad \text{Formula (II ter)}$$

in which $BSS_k$ is the Blaine specific surface area of the clinker given in cm²/g,
$W_{eff}$ is the quantity of effective water in l/m³.

If the quantity of clinker calculated from formulae (II), (II bis) and (II ter) herein above is greater than 200 kg/m³, then the wet concrete composition produced from this clinker is not comprised in the invention, which is to say in the concretes with low contents of clinker.

As explained in relation to Formulae (I) and (I bis), Formulae (ii), (II bis) and (II ter) are empirical formulae, which may be used by simply replacing the Blaine specific surface area of the clinker and the quantity of effective water given in the units specified in the description (cm²/g or l/m³). For example, to apply formula (II) with the values of example FA1-1, for which the Blaine specific surface area of the clinker is equal to 7041 cm²/g and the quantity of effective water is equal to 165.1 l/m³, then the minimum quantity of clinker is equal to:

$$[(-0.021 \times BSS_k) + 230] \times (W_{eff} \div 140)$$

$$[(-0.021 \times 7041) + 230] \times (165.1 \div 140)$$

$$[-147.861 + 230] \times 1.18$$

$$82.139 \times 1.18$$

$$96.9 \text{ kg/m}^3.$$

Preferably, the minimum quantity of clinker in the concrete according to the invention may be obtained from the table herein below, relative to the Blaine specific surface area of the clinker and of the quantity of effective water (replacing the use of Formulae (II), (II bis) and (II ter)):

| $BSS_k$ (cm²/g) | $W_{eff}$ = 140 l/m³ | $W_{eff}$ = 150 l/m³ | $W_{eff}$ = 160 l/m³ | $W_{eff}$ = 170 l/m³ | $W_{eff}$ = 180 l/m³ | $W_{eff}$ = 190 l/m³ | $W_{eff}$ = 200 l/m³ | $W_{eff}$ = 210 l/m³ | $W_{eff}$ = 220 l/m³ |
|---|---|---|---|---|---|---|---|---|---|
| | | | | Minimum quantity of clinker (kg/m³) | | | | | |
| 4500 | 135.5 | 145.18 | 154.86 | 164.54 | 174.21 | 183.89 | 193.57 | 203.25 | 212.93 |
| 4600 | 133.4 | 142.93 | 152.46 | 161.99 | 171.51 | 181.04 | 190.57 | 200.1 | 209.63 |
| 4700 | 131.3 | 140.68 | 150.06 | 159.44 | 168.81 | 178.19 | 187.57 | 196.95 | 206.33 |
| 4800 | 129.2 | 138.43 | 147.66 | 156.89 | 166.11 | 175.34 | 184.57 | 193.8 | 203.03 |
| 4900 | 127.1 | 136.18 | 145.26 | 154.34 | 163.41 | 172.49 | 181.57 | 190.65 | 199.73 |
| 5000 | 125 | 133.93 | 142.86 | 151.79 | 160.71 | 169.64 | 178.57 | 187.5 | 196.43 |
| 5100 | 122.9 | 131.68 | 140.46 | 149.24 | 158.01 | 166.79 | 175.57 | 184.35 | 193.13 |
| 5200 | 120.8 | 129.43 | 138.06 | 146.69 | 155.31 | 163.94 | 172.57 | 181.2 | 189.63 |
| 5300 | 118.7 | 127.18 | 135.66 | 144.14 | 152.61 | 161.09 | 169.57 | 178.05 | 186.53 |
| 5400 | 116.6 | 124.93 | 133.26 | 141.59 | 149.91 | 158.24 | 166.57 | 174.9 | 183.23 |
| 5500 | 114.5 | 122.68 | 130.86 | 139.04 | 147.21 | 155.39 | 163.57 | 171.75 | 179.93 |
| 5600 | 112.4 | 120.43 | 128.46 | 136.49 | 144.51 | 152.54 | 160.57 | 168.6 | 176.63 |
| 5700 | 110.3 | 118.18 | 126.06 | 133.94 | 141.81 | 149.69 | 157.57 | 165.45 | 173.33 |
| 5800 | 108.2 | 115.93 | 123.66 | 131.39 | 139.11 | 146.84 | 154.57 | 162.3 | 170.03 |
| 5900 | 106.1 | 113.68 | 121.26 | 128.84 | 136.41 | 143.99 | 151.57 | 159.15 | 166.73 |
| 6000 | 104 | 111.43 | 118.86 | 126.29 | 133.71 | 141.14 | 148.57 | 156 | 163.43 |
| 6100 | 101.9 | 109.18 | 116.46 | 123.74 | 131.01 | 138.29 | 145.57 | 152.85 | 160.13 |
| 6200 | 99.8 | 106.93 | 114.06 | 121.19 | 128.31 | 135.44 | 142.57 | 149.7 | 156.83 |
| 6300 | 97.7 | 104.68 | 111.66 | 118.64 | 125.61 | 132.59 | 139.57 | 146.55 | 153.53 |
| 6400 | 95.6 | 102.43 | 109.26 | 116.09 | 122.91 | 129.74 | 136.57 | 143.4 | 150.23 |
| 6500 | 93.5 | 100.18 | 106.86 | 113.54 | 120.21 | 126.89 | 133.57 | 140.25 | 146.93 |
| 6600 | 91.4 | 97.93 | 104.46 | 110.99 | 117.51 | 124.04 | 130.57 | 137.1 | 143.63 |
| 6700 | 89.3 | 95.68 | 102.06 | 108.44 | 114.81 | 121.19 | 127.57 | 133.95 | 140.33 |
| 6800 | 87.2 | 93.43 | 99.66 | 105.89 | 112.11 | 118.34 | 124.57 | 130.8 | 137.03 |
| 6900 | 85.1 | 91.18 | 97.26 | 103.34 | 109.41 | 115.49 | 121.57 | 127.65 | 133.73 |
| 7000 | 83 | 88.93 | 94.86 | 100.79 | 106.71 | 112.64 | 118.57 | 124.5 | 130.43 |
| 7100 | 80.9 | 86.68 | 92.46 | 98.24 | 104.01 | 109.79 | 115.57 | 121.35 | 127.13 |
| 7200 | 78.8 | 84.43 | 90.06 | 95.69 | 101.31 | 106.94 | 112.57 | 118.2 | 123.83 |
| 7300 | 76.7 | 82.18 | 87.66 | 93.14 | 98.61 | 104.09 | 109.57 | 115.05 | 120.53 |
| 7400 | 74.6 | 79.93 | 85.26 | 90.59 | 95.91 | 101.24 | 105.57 | 111.9 | 117.23 |
| 7500 | 72.5 | 77.68 | 82.86 | 88.04 | 93.21 | 98.39 | 103.57 | 108.75 | 113.93 |
| 7600 | 70.4 | 75.43 | 80.46 | 85.49 | 90.51 | 95.54 | 100.57 | 105.6 | 110.63 |
| 7700 | 68.3 | 73.18 | 78.06 | 82.94 | 87.81 | 92.69 | 97.57 | 102.45 | 107.33 |
| 7800 | 66.2 | 70.93 | 75.66 | 80.39 | 85.11 | 89.84 | 94.57 | 99.3 | 104.03 |
| 7900 | 64.1 | 68.68 | 73.26 | 77.84 | 82.41 | 86.99 | 91.57 | 96.15 | 100.73 |
| 8000 | 62 | 66.43 | 70.86 | 75.29 | 79.71 | 84.14 | 88.57 | 93 | 97.43 |
| 8100 | 59.9 | 64.18 | 68.46 | 72.74 | 77.01 | 81.29 | 85.57 | 89.85 | 94.13 |
| 8200 | 57.8 | 61.93 | 66.06 | 70.19 | 74.31 | 78.44 | 82.57 | 86.7 | 90.83 |

-continued

| BSS$_k$ (cm$^2$/g) | W$_{eff}$ = 140 l/m$^3$ | W$_{eff}$ = 150 l/m$^3$ | W$_{eff}$ = 160 l/m$^3$ | W$_{eff}$ = 170 l/m$^3$ | W$_{eff}$ = 180 l/m$^3$ | W$_{eff}$ = 190 l/m$^3$ | W$_{eff}$ = 200 l/m$^3$ | W$_{eff}$ = 210 l/m$^3$ | W$_{eff}$ = 220 l/m$^3$ |
|---|---|---|---|---|---|---|---|---|---|
| 8300 | 55.7 | 59.68 | 63.66 | 67.64 | 71.61 | 75.59 | 79.57 | 83.55 | 87.53 |
| 8400 | 53.6 | 57.43 | 61.26 | 65.09 | 68.91 | 72.74 | 76.57 | 80.4 | 84.23 |
| 8500 | 51.5 | 55.18 | 58.86 | 62.54 | 66.21 | 69.89 | 73.57 | 77.25 | 80.93 |
| 8600 | 49.4 | 52.93 | 56.46 | 59.99 | 63.51 | 67.04 | 70.57 | 74.1 | 77.63 |
| 8700 | 47.3 | 50.68 | 54.06 | 57.44 | 60.81 | 64.19 | 67.57 | 70.95 | 74.33 |
| 8800 | 45.2 | 48.43 | 51.66 | 54.89 | 58.11 | 61.34 | 64.57 | 67.8 | 71.03 |
| 8900 | 43.1 | 46.18 | 49.26 | 52.34 | 55.41 | 58.49 | 61.57 | 64.65 | 67.73 |
| 9000 | 41 | 43.93 | 46.86 | 49.79 | 52.71 | 55.64 | 58.57 | 61.5 | 64.43 |
| 9100 | 38.9 | 41.68 | 44.46 | 47.24 | 50.01 | 52.79 | 55.57 | 58.35 | 61.13 |
| 9200 | 36.8 | 39.43 | 42.06 | 44.69 | 47.31 | 49.94 | 52.57 | 55.2 | 57.83 |
| 9300 | 34.7 | 37.18 | 39.66 | 42.14 | 44.61 | 47.09 | 49.57 | 52.05 | 54.53 |
| 9400 | 32.6 | 34.93 | 37.26 | 39.59 | 41.91 | 44.24 | 46.57 | 48.9 | 51.23 |
| 9500 | 30.5 | 32.68 | 34.86 | 37.04 | 39.21 | 41.39 | 43.57 | 45.75 | 47.93 |
| Preferred minimum quantity of clinker (kg/m$^3$) | | | | | | | | | |
| 4500 | 155.5 | 166.61 | 177.71 | 188.82 | 199.93 | 211.04 | 222.14 | 233.25 | 244.36 |
| 4600 | 153.4 | 164.36 | 175.31 | 186.27 | 197.23 | 208.19 | 219.14 | 230.1 | 241.06 |
| 4700 | 151.3 | 162.11 | 172.91 | 183.72 | 194.53 | 205.34 | 216.14 | 226.95 | 237.76 |
| 4800 | 149.2 | 159.86 | 170.51 | 181.17 | 191.83 | 202.49 | 213.14 | 223.8 | 234.46 |
| 4900 | 147.1 | 157.61 | 168.11 | 178.62 | 189.13 | 199.64 | 210.14 | 220.65 | 231.16 |
| 5000 | 145 | 155.36 | 165.71 | 176.07 | 186.43 | 196.79 | 207.14 | 217.5 | 227.86 |
| 5100 | 142.9 | 153.11 | 163.31 | 173.52 | 183.73 | 193.94 | 204.14 | 214.35 | 224.56 |
| 5200 | 140.8 | 150.86 | 160.91 | 170.97 | 181.03 | 191.09 | 201.14 | 211.2 | 221.26 |
| 5300 | 138.7 | 148.61 | 158.51 | 168.42 | 178.33 | 188.24 | 198.14 | 208.05 | 217.96 |
| 5400 | 136.6 | 146.36 | 156.11 | 165.87 | 175.63 | 185.39 | 195.14 | 204.9 | 214.66 |
| 5500 | 134.5 | 144.11 | 153.71 | 163.32 | 172.93 | 182.54 | 192.14 | 201.75 | 211.36 |
| 5600 | 132.4 | 141.86 | 151.31 | 160.77 | 170.23 | 179.69 | 189.14 | 198.6 | 208.06 |
| 5700 | 130.3 | 139.61 | 148.91 | 158.22 | 167.53 | 176.84 | 186.14 | 195.45 | 204.76 |
| 5800 | 128.2 | 137.36 | 146.51 | 155.67 | 164.83 | 173.99 | 183.14 | 192.3 | 201.46 |
| 5900 | 126.1 | 135.11 | 44.11 | 153.12 | 162.13 | 171.14 | 180.14 | 189.15 | 198.16 |
| 6000 | 124 | 132.86 | 141.71 | 150.57 | 159.43 | 168.29 | 177.14 | 186 | 194.86 |
| 6100 | 121.9 | 130.61 | 139.31 | 148.02 | 156.73 | 165.44 | 174.14 | 182.85 | 191.56 |
| 6200 | 119.8 | 128.36 | 136.91 | 145.47 | 154.03 | 162.59 | 171.14 | 179.7 | 188.26 |
| 6300 | 117.7 | 126.11 | 134.51 | 142.92 | 151.33 | 159.74 | 168.14 | 176.55 | 184.96 |
| 6400 | 115.6 | 123.86 | 132.11 | 140.37 | 148.63 | 156.89 | 165.14 | 173.4 | 181.66 |
| 6500 | 113.5 | 121.61 | 129.71 | 137.82 | 145.93 | 154.04 | 162.14 | 170.25 | 178.36 |
| 6600 | 111.4 | 119.36 | 127.31 | 135.27 | 143.23 | 151.19 | 159.14 | 167.1 | 175.06 |
| 6700 | 109.3 | 117.11 | 124.91 | 132.72 | 140.53 | 148.34 | 156.14 | 163.95 | 171.76 |
| 6800 | 107.2 | 114.86 | 122.51 | 130.17 | 137.83 | 145.49 | 153.14 | 160.8 | 168.46 |
| 6900 | 105.1 | 112.61 | 120.11 | 127.62 | 135.13 | 142.64 | 150.14 | 157.65 | 165.16 |
| 7000 | 103 | 110.36 | 117.71 | 125.07 | 132.43 | 139.79 | 147.14 | 154.5 | 161.86 |
| 7100 | 100.9 | 108.11 | 115.31 | 122.52 | 129.73 | 136.94 | 144.14 | 151.35 | 158.56 |
| 7200 | 98.8 | 105.86 | 112.91 | 119.97 | 127.03 | 134.09 | 141.14 | 148.2 | 155.26 |
| 7306 | 96.7 | 103.61 | 110.51 | 117.42 | 124.33 | 131.24 | 138.14 | 145.05 | 151.96 |
| 7400 | 94.6 | 101.36 | 108.11 | 114.87 | 121.63 | 128.39 | 135.14 | 141.9 | 148.66 |
| 7500 | 92.5 | 99.11 | 105.71 | 112.32 | 118.93 | 125.54 | 132.14 | 138.75 | 145.36 |
| 7600 | 90.4 | 96.86 | 103.31 | 109.77 | 116.23 | 122.69 | 129.14 | 135.6 | 142.06 |
| 7700 | 88.3 | 94.61 | 100.91 | 107.22 | 113.53 | 119.84 | 126.14 | 132.45 | 138.76 |
| 7800 | 86.2 | 92.36 | 98.51 | 104.67 | 110.83 | 116.99 | 123.14 | 129.3 | 135.46 |
| 7900 | 84.1 | 90.11 | 96.11 | 102.12 | 108.13 | 114.14 | 120.14 | 126.15 | 132.16 |
| 8000 | 82 | 87.86 | 93.71 | 99.57 | 105.43 | 111.29 | 117.14 | 123 | 128.86 |
| 8100 | 79.9 | 85.61 | 91.31 | 97.02 | 102.73 | 108.44 | 114.14 | 119.85 | 125.56 |
| 8200 | 77.8 | 83.36 | 88.91 | 94.47 | 100.03 | 105.69 | 111.14 | 116.7 | 122.26 |
| 8300 | 75.7 | 81.11 | 86.51 | 91.92 | 97.33 | 102.74 | 108.14 | 113.55 | 118.96 |
| 8400 | 73.6 | 78.86 | 84.11 | 89.37 | 94.63 | 99.89 | 105.14 | 110.4 | 115.66 |
| 8500 | 71.5 | 76.61 | 81.71 | 86.82 | 91.93 | 97.04 | 102.14 | 107.25 | 112.36 |
| 8600 | 69.4 | 74.36 | 79.31 | 84.27 | 89.23 | 94.19 | 99.14 | 104.1 | 109.06 |
| 8700 | 67.3 | 72.11 | 76.91 | 81.72 | 86.53 | 91.34 | 96.14 | 100.95 | 105.76 |
| 8800 | 65.2 | 69.86 | 74.51 | 79.17 | 83.83 | 88.49 | 93.14 | 97.8 | 102.46 |
| 8900 | 63.1 | 67.61 | 72.11 | 76.62 | 81.13 | 85.64 | 90.14 | 94.65 | 99.16 |
| 9000 | 61 | 65.36 | 69.71 | 74.07 | 78.43 | 82.79 | 87.14 | 91.5 | 95.86 |
| 9100 | 58.9 | 63.11 | 67.31 | 71.52 | 75.73 | 79.94 | 84.14 | 88.35 | 92.56 |
| 9200 | 56.8 | 60.86 | 64.91 | 68.97 | 73.03 | 77.09 | 81.14 | 85.2 | 89.26 |
| 9300 | 54.7 | 58.61 | 62.51 | 66.42 | 70.33 | 74.24 | 78.14 | 82.05 | 85.96 |
| 9400 | 52.6 | 56.36 | 60.11 | 63.87 | 67.63 | 71.39 | 75.14 | 78.9 | 82.66 |
| 9500 | 50.5 | 54.11 | 57.71 | 61.32 | 64.93 | 68.54 | 72.14 | 75.75 | 79.36 |
| Most preferred minimum quantity of clinker (kg/m$^3$) | | | | | | | | | |
| 4500 | 175.5 | 188.04 | 200.57 | 213.11 | 225.64 | 238.18 | 250.71 | 263.25 | 275.79 |
| 4600 | 173.4 | 185.79 | 198.17 | 210.56 | 222.94 | 235.33 | 247.71 | 260.1 | 272.49 |
| 4700 | 171.3 | 183.54 | 195.77 | 208.01 | 220.24 | 232.48 | 244.71 | 256.95 | 269.19 |
| 4800 | 169.2 | 181.29 | 193.37 | 205.46 | 217.54 | 229.63 | 241.71 | 253.8 | 265.89 |
| 4900 | 167.1 | 179.04 | 190.97 | 202.91 | 214.84 | 226.78 | 238.71 | 250.65 | 262.59 |
| 5000 | 165 | 176.79 | 188.57 | 200.36 | 212.14 | 223.93 | 235.71 | 247.5 | 259.29 |
| 5100 | 162.9 | 174.54 | 186.17 | 197.81 | 209.44 | 221.08 | 232.71 | 244.35 | 255.99 |
| 5200 | 160.8 | 172.29 | 183.77 | 195.26 | 206.74 | 218.23 | 229.71 | 241.2 | 252.69 |
| 5300 | 158.7 | 170.04 | 181.37 | 192.71 | 204.04 | 215.38 | 226.71 | 238.05 | 249.39 |

-continued

| $BSS_k$ (cm²/g) | $W_{eff}$= 140 l/m³ | $W_{eff}$= 150 l/m³ | $W_{eff}$= 160 l/m³ | $W_{eff}$= 170 l/m³ | $W_{eff}$= 180 l/m³ | $W_{eff}$= 190 l/m³ | $W_{eff}$= 200 l/m³ | $W_{eff}$= 210 l/m³ | $W_{eff}$= 220 l/m³ |
|---|---|---|---|---|---|---|---|---|---|
| 5400 | 156.6 | 167.79 | 178.97 | 190.16 | 201.34 | 212.53 | 223.71 | 234.9 | 246.09 |
| 5500 | 154.5 | 165.54 | 176.57 | 187.61 | 198.64 | 209.68 | 220.71 | 231.75 | 242.79 |
| 5600 | 152.4 | 163.29 | 174.17 | 185.06 | 195.94 | 206.83 | 217.71 | 228.6 | 239.49 |
| 5700 | 150.3 | 161.04 | 171.77 | 182.51 | 193.24 | 203.98 | 214.71 | 225.45 | 236.19 |
| 5800 | 148.2 | 158.79 | 169.37 | 179.96 | 190.54 | 201.13 | 211.71 | 222.3 | 232.89 |
| 5900 | 146.1 | 156.54 | 166.97 | 177.41 | 187.84 | 198.28 | 208.71 | 219.15 | 229.59 |
| 6000 | 144 | 154.29 | 164.57 | 174.86 | 185.14 | 195.43 | 205.71 | 216 | 226.29 |
| 6100 | 141.9 | 152.04 | 162.17 | 172.31 | 182.44 | 192.58 | 202.71 | 212.85 | 222.99 |
| 6200 | 139.8 | 149.79 | 159.77 | 169.76 | 179.74 | 189.73 | 199.71 | 209.7 | 219.69 |
| 6300 | 137.7 | 147.54 | 157.37 | 167.21 | 177.04 | 186.88 | 196.71 | 206.55 | 216.39 |
| 6400 | 135.6 | 145.29 | 154.97 | 164.66 | 174.34 | 184.03 | 193.71 | 203.4 | 213.09 |
| 6500 | 133.5 | 143.04 | 152.57 | 162.11 | 171.64 | 181.18 | 190.71 | 200.25 | 209.79 |
| 6600 | 131.4 | 140.79 | 150.17 | 159.56 | 168.94 | 178.33 | 187.71 | 197.1 | 206.49 |
| 6700 | 129.3 | 138.54 | 147.77 | 157.01 | 166.24 | 175.48 | 184.71 | 193.95 | 203.19 |
| 6800 | 127.2 | 136.29 | 145.37 | 154.46 | 163.54 | 172.63 | 181.71 | 190.8 | 199.89 |
| 6900 | 125.1 | 134.04 | 142.97 | 151.91 | 160.84 | 169.78 | 178.71 | 187.65 | 196.59 |
| 7000 | 123 | 131.79 | 140.57 | 149.36 | 158.14 | 166.93 | 175.71 | 184.5 | 193.29 |
| 7100 | 120.9 | 129.54 | 138.17 | 146.81 | 155.44 | 164.08 | 172.71 | 181.35 | 189.99 |
| 7200 | 118.8 | 127.29 | 135.77 | 144.26 | 152.74 | 161.23 | 169.71 | 176.2 | 186.69 |
| 7300 | 116.7 | 125.04 | 133.37 | 141.71 | 150.04 | 158.38 | 166.71 | 175.05 | 183.39 |
| 7400 | 114.6 | 122.79 | 130.97 | 139.16 | 147.34 | 155.53 | 163.71 | 171.9 | 180.09 |
| 7500 | 112.5 | 120.54 | 128.57 | 136.61 | 144.64 | 152.68 | 160.71 | 168.75 | 176.79 |
| 7600 | 110.4 | 118.29 | 126.17 | 134.06 | 141.94 | 149.83 | 157.71 | 165.6 | 173.49 |
| 7700 | 108.3 | 116.04 | 123.77 | 131.51 | 139.24 | 146.98 | 154.71 | 162.45 | 170.19 |
| 7800 | 106.2 | 113.79 | 121.37 | 128.96 | 136.54 | 144.13 | 151.71 | 159.3 | 166.89 |
| 7900 | 104.1 | 111.54 | 118.97 | 126.41 | 133.84 | 141.28 | 148.71 | 156.15 | 163.59 |
| 8000 | 102 | 109.29 | 116.57 | 123.86 | 131.14 | 138.43 | 145.71 | 153 | 160.29 |
| 8100 | 99.9 | 107.04 | 114.17 | 121.31 | 128.44 | 135.58 | 142.71 | 149.85 | 156.99 |
| 8200 | 97.8 | 104.79 | 111.77 | 118.76 | 125.74 | 132.73 | 139.71 | 146.7 | 153.69 |
| 8300 | 95.7 | 102.54 | 109.37 | 116.21 | 123.04 | 129.88 | 136.71 | 143.55 | 150.39 |
| 8400 | 93.6 | 100.29 | 106.97 | 113.66 | 120.34 | 127.03 | 133.71 | 140.4 | 147.09 |
| 8500 | 91.5 | 98.04 | 104.57 | 111.11 | 117.64 | 124.18 | 130.71 | 137.25 | 143.79 |
| 8600 | 89.4 | 95.79 | 102.17 | 108.56 | 114.94 | 121.33 | 127.71 | 134.1 | 140.49 |
| 8700 | 87.3 | 93.54 | 99.77 | 106.01 | 112.24 | 118.48 | 124.71 | 130.95 | 137.19 |
| 8800 | 85.2 | 91.29 | 97.37 | 103.46 | 109.54 | 115.63 | 121.71 | 127.8 | 133.89 |
| 8900 | 83.1 | 89.04 | 94.97 | 100.91 | 106.84 | 112.78 | 118.71 | 124.65 | 130.59 |
| 9000 | 81 | 86.79 | 92.57 | 98.36 | 104.14 | 109.93 | 115.71 | 121.5 | 127.29 |
| 9100 | 78.9 | 84.54 | 90.17 | 95.81 | 101.44 | 107.08 | 112.71 | 118.35 | 123.99 |
| 9200 | 76.8 | 82.29 | 87.77 | 93.26 | 98.74 | 104.23 | 109.71 | 115.2 | 120.69 |
| 9300 | 74.7 | 80.04 | 85.37 | 90.71 | 96.04 | 101.38 | 106.71 | 112.05 | 117.39 |
| 9400 | 72.6 | 77.79 | 82.97 | 88.16 | 93.34 | 98.53 | 103.71 | 108.9 | 114.09 |
| 9500 | 70.5 | 75.54 | 80.57 | 85.61 | 90.64 | 95.68 | 100.71 | 105.75 | 110.79 |

Preferably, the minimum quantity in kg/m³ of complementary materials having a Dv90 less than or equal to 200 μm selected from limestone powders, calcined shale, metakaolins, siliceous fillers, silica powders, pozzolans, slags, fly ash and mixtures thereof is determined according to the following formula (III bis):

250−(quantity of fly ash)−(quantity of clinker)−(quantity of alkali sulphate)−(quantity of a source of $SO_3$)     Formula (III bis)

If the application of formulae (III) or (III bis) herein above gives a value less than 0, this means that it is not necessary to add complementary materials to obtain the announced performances.

According to a variant, the wet concrete composition according to the invention does not comprise a plasticizer. <<Plasticizer>> is understood according to the present invention as a water-reducing plasticizer or a high water-reducing superplasticizer according to the NF EN 934-2 Standard.

<<kg/m³>> is understood as the mass of materials to be used per m³ of produced concrete.

Preferably, the complementary materials are limestone powders.

The quantity of the said clinker used is preferably less than 180 kg/m³, preferably less than 150 kg/m³, preferably less than 120 kg/m³.

According to an embodiment of the process for preparation of the wet concrete according to the invention, the quantity of effective water used varies from 140 to 200 l/m³, preferably from 150 to 180 l/m³. According to certain embodiments, this quantity of effective water is therefore reduced compared to a typical concrete.

Preferably the aggregates comprise sand and gravel and the mass ratio of the quantity of sand to the quantity of gravel is comprised from 1.5/1 to 1/1.8, more particularly from 1.25/1 to 1/1.4, in particular from 1.2/1 to 1/1.2, and ideally equal or close to 1/1.

The materials in question have, according to particular embodiments, the same characteristics as those described above relative to the binder mixes and premixes according to the invention.

The mixing is done using a conventional mixer at a concrete mixing plant or directly in a drum-truck mixer, for a mixing time usual in the art.

The wet concrete compositions obtained according to the invention have comparable mechanical properties, preferably at least as good, even better compared to standard C25/30 types of concretes, in particular in terms of compressive strength at 16 hours and at 28 days and in terms of rheology.

In particular, according to an embodiment of the invention, the average compressive strength is greater than or equal to 6 MPa, preferably greater than or equal to 7 MPa, at 20° C. 24 hours after mixing, and greater than or equal to 25 MPa, preferably greater than or equal to 28 MPa, 28 days after mixing.

According to an embodiment of the wet concrete according to the invention, the slump using the Abrams cone (or slump value) is comprised from 0 to 250 mm, preferably from 100 to 240 mm, the measurement being done according to the EN 12350-2 European Standard, of December 1999.

According to an embodiment of the wet concrete according to the invention, the spread after one minute is comprised from 50 to 140 mm, preferably from 85 to 105 mm using the ASTM C230 Standard cone in the absence of vibrations.

According to an embodiment of the wet concrete according to the invention, the spread after one minute is comprised from 180 to 270 mm, preferably from 215 to 235 mm using the ASTM C230 standard cone in the presence of vibrations, the measurement being done as indicated in example 6 below.

Hence the concretes according to the invention have equivalent rheological properties to typical C25/30 or C20/25 concretes.

Preferably, the concretes according to the invention are threshold concretes. <<Threshold concrete>> is understood as a concrete (wet) which requires the supply of positive energy (for example a shear force, a vibration or a shock) in order to trigger its flow. In contrast, a non-threshold concrete flows by itself, without supply of external energy. Thus, the threshold concrete behaves essentially, below an energy threshold, like a deformable elastic solid; and above this energy threshold, like a viscous fluid.

The quantity of clinker used to prepare the concrete according to the invention is very much less than what is necessary to prepare a standard C25/30 or C20/25 concrete, which provides a means of making spectacular savings in terms of $CO_2$ emissions. Compared to a control C25/30 formula which contains 95 kg/m$^3$ of limestone and 257 kg/m$^3$ of cement, a concrete according to the invention containing for example from 100 to 120 kg/m$^3$ of clinker provides a saving of $CO_2$ emissions in the range of 50 to 60%.

The concrete according to the invention may be cast according to ordinary methods; after hydration/hardening hardened concrete objects are obtained such as construction elements, structural elements or others.

The following examples illustrate the invention without limiting it.

EXAMPLES

The Laser Granulometry Method:

The granulometry curves of the different powders are obtained using a Malvern MS2000 laser granulometer. The measurement is carried out by the wet method (aqueous medium); the size of the particles must be from 0.02 µm to 2 mm. The light source is provided by a red He—Ne laser (632 nm) and a blue diode (466 nm). The optical model is that of Fraunhofer, the calculation matrix is of the polydisperse type.

A measurement of the background noise is first carried out at a pump speed of 2000 rpm, a stirrer speed of 800 rpm and a noise measurement for 10 s, in the absence of ultrasound. During the calibration/blank measurement phase of the apparatus, the light intensity of the laser is verified to be at least equal to 80%, and that a decreasing exponential curve for the background noise is obtained. Otherwise, the cell lenses must be cleaned.

A first measurement is then carried out on the sample with the following parameters: pump speed: 2000 rpm, stirrer speed: 800 rpm, absence of ultrasound. The sample is introduced so as to have an obscuration from 10 to 20%. <<Obscuration>> is understood as the extinction of the laser signal by the suspension circulating between the emitter and the central sensor (Turbidimeter). 100% obscuration corresponds to complete extinction of the signal. In contrast, 0% obscuration corresponds to pure translucent fluid without any particles. The obscuration depends on the concentration of solids in the suspension and the refractive index of the particles. After stabilization of the obscuration, the measurement is carried out with a fixed period between immersion and measurement set at 10 s. The duration of the measurement is 30 s (30000 diffraction images analyzed). In the obtained granulogram the fact that part of the population of the powder may be agglomerated should be taken into account.

Then a second measurement is carried out (without emptying the tank) with ultrasound. The pump speed is brought to 2500 rpm, the stirring to 1000 rpm, the ultrasound is emitted at 100% (30 watts). These conditions are maintained for 3 minutes, then, the initial parameters are restored: pump speed of 2000 rpm, stirrer speed of 800 rpm, absence of ultrasound. At the end of 10 s (to remove any possible air bubbles), a measurement is made for 30 s (30000 images analyzed). This second measurement corresponds to a de-agglomerated powder by ultrasonic dispersion.

Each measurement is repeated at least twice to verify the stability of the result. The apparatus is calibrated before each work session by means of a standard sample (Sifraco C10 silica) for which the granulometric curve is known. All the measurements given in the description and the indicated ranges correspond to values obtained with ultrasound.

Method for Measurement of the BET Specific Surface Area:

The specific surface area of different powders is measured as follows. A sample of powder is taken of the following mass: 0.1 to 0.2 g for an estimated specific surface area of more than 30 m$^2$/g; 0.3 g for an estimated specific surface area of 10-30 m$^2$/g; 1 g for estimated specific surface area of 3-10 m$^2$/g; 1.5 g for an estimated specific surface area of 2-3 m$^2$/g; 2 g for an estimated specific surface area of 1.5-2 m$^2$/g; 3 g for an estimated specific surface area of 1-1.5 m$^2$/g.

A 3 cm$^3$ or a 9 cm$^3$ cell is used depending on the volume of the sample. The measurement cell assembly (cell+glass rod) is weighed. Then the sample is added to the cell: the product must not be less than one millimeter from the top of the neck of the cell. The assembly is weighed (cell+glass rod+sample). The measurement cell is placed on a degassing unit and the sample is degassed. The degassing parameters are 30 min/45° C. for Portland cement, gypsum, pozzolans; 3 hours/200° C. for slags, silica fume, fly ash, aluminous cement, limestone; and 4 hours/300° C. for control alumina. The cell is rapidly closed with a stopper after degassing. The assembly is weighed and the result is noted. All the weighing is carried out without the stopper. The mass of the sample is obtained by subtracting the mass of the cell from the mass of the cell+ degassed sample.

The analysis of the sample is then carried out after placing it on the measurement unit. The analyzer is the Beckman Coulter SA 3100. The measurement is based on the adsorption of nitrogen by the sample at a given temperature, in this case the temperature of the liquid nitrogen, that is −196° C. The apparatus measures the pressure of the reference cell in which the adsorbate is at its saturated vapour pressure and that of the cell of the sample in which known volumes of adsorbate are injected. The resulting curve of these measurements is the adsorption isotherm. In the measurement process it is necessary to know the dead space of the cell: a measurement of this volume is therefore carried out with helium before the analysis.

The mass of the sample, calculated beforehand is entered as a parameter. The BET surface is determined by the software by linear regression from the experimental curve. The standard deviation on reproducibility obtained from 10 measurements on a silica with a specific surface area of 21.4 m$^2$/g is 0.07. The standard deviation on reproducibility obtained from 10 measurements on a cement with a specific surface area of 0.9 m²/g is 0.02. A control is carried out once every two weeks on a reference product. Twice a year a control is carried out with control alumina provided by the manufacturer.

Method for Measurement of the Blaine Specific Surface Area:

The Blaine specific surface area is determined according to the EN 196-6 Standard, paragraph 4.

Complementary Materials:
the following limestone filler was used:
BL200 (supplier Omya) with a BET specific surface area of 0.86 m²/g and a methylene blue value, $MB_F$ of 0.3 g/100 g according to the NF EN 933-9 Standard.

The characteristics of the different components used in the examples are given in the table herein below:

| Name | SPLC dv97 = 16 μm | SPLC dv97 = 19 μm | Sundance fly ash | Le Havre fly ash | Popiol fly ash | TES fly ash | Calcium sulphate | BL 200 |
|---|---|---|---|---|---|---|---|---|
| $SiO_2$ (%) | 20.15 | 20.38 | 54.70 | 50.98 | 49.66 | 48.69 | 1.69 | 0.00 |
| $Al_2O_3$ (%) | 4.91 | 4.85 | 23.28 | 26.73 | 24.80 | 19.01 | 0.27 | 0.03 |
| $Fe_2O_3$ (%) | 3.05 | 3.03 | 3.82 | 4.74 | 5.75 | 9.7 | 0.10 | 0.03 |
| CaO (%) | 64.62 | 64.71 | 10.92 | 4.14 | 3.85 | 11.75 | 38.81 | 55.55 |
| MgO (%) | 0.97 | 0.91 | 1.08 | 1.73 | 2.68 | 2.55 | 1.56 | 0.16 |
| $K_2O$ (%) | 0.92 | 0.86 | 0.84 | 1.65 | 3.00 | 2.21 | 0.05 | 0.00 |
| $Na_2O$ (%) | 0.21 | 0.16 | 3.15 | 0.53 | 0.99 | 1.06 | 0.04 | 0.03 |
| $SO_3$ (%) | 3.23 | 3.07 | 0.20 | 0.74 | 0.72 | 1.57 | 52.00 | 0.00 |
| BET specific surface area (m²/g) | 1.83 | 1.60 | 1.31 | 2.38 | 3.94 | 6.99 | 8.1 | 0.79 |
| BLAINE specific surface area (cm²/g) | 7 041 | 6 364 | | | | | | 4 093 |
| Volume weight (g/cm³) | 3.18 | 3.15 | 2.09 | 2.31 | 2.18 | 2.2 | 2.87 | 2.73 |
| Dv90 (μm) | 12.9 | 14.7 | 70.67 | 107.27 | 161.11 | 157.88 | 66.60 | 43.30 |

The Raw Materials:

The following materials were more particularly used in the following.

Cement:

CPA CEM I 52.5 R cement was used (from Lafarge Cements—Saint-Pierre la Cour cement plant, referred to as « SPLC» ). This cement typically contained 90 to 95% of clinker, 0.5 to 3% of limestone and 2 to 5% of gypsum+hemihydrate+anhydrite and optionally grinding agents and/or chromium VI reducers. Therefore, this cement comprised at least 90% of clinker. This cement was micronised using an Alpine Hosokawa AFG200 opposing air-jet mill. The rotation speed of the turbine was set in order to obtain the desired fineness (16 or 19 μm). Two batches were used for the examples. A first batch referred to as « SPLC–dv97= 16 μm» for which the fineness was characterised by a dv97 equal to 16 μm, and a second batch referred to as « SPLC–dv97=19 μm» for which the fineness was characterised by a dv97 equal to 19 μm.

The HTS CPA CEM I 52.5 PEMS cement, referred to as « Le Teil» , (supplied by Lafarge) was used for the control concrete (reference C25/30).

Calcium Sulphate:

ground anhydrite produced by Lafarge Gypsum was used—the Mazan quarry, Vaucluse, France.

Fly ash: Four fly ash were used:

a fly ash of class C (ASTM C618) from the thermal power plant of TransAlta located at « Sundance» , Alberta, Canada;

a fly ash of class V (NF EN 197-1) from the EDF thermal power plant located at « Le Havre» , France;

a fly ash of class V (NF EN 197-1) from the thermal power plant of « Popiol» , Poland; and a fly ash of class W (EN 450-1) from the thermal power plant of Termoelektrarna, Sostanj, Slovenia. This fly ash will be referred to as « TES» .

Activators Used:
1. a powder sodium sulphate ($Na_2SO_4$) distributed by VWR-Prolabo. The product used was minimum 99% pure and had a molar mass of 142.040 g/mol. It contained 43.6% of $Na_2O$ and 56.4% of $SO_3$;
2. a powder lithium sulphate ($Li_2SO_4$) distributed by Sigma-Aldrich. The product used was minimum 98.0% pure and had a molar mass of 109.94 g/mol. It contained 27.1% of $Li_2O$ and 72.9% of $SO_3$;
3. a powder potassium sulphate ($K_2SO_4$) distributed by Sigma-Aldrich. The product used was minimum 98.0% pure and had a molar mass of 174.26 g/mol. It contained 35.6% of $K_2O$ and 46.0% of $SO_3$;
4. a powder lithium hydroxide ($LiOH.H_2O$) distributed by Chemetall GMBH. The product contained 57% of LiOH, which was 74.0% of $Li_2O$;
5. a powder sodium carbonate ($Na_2CO_3$) distributed by Sigma-Aldrich. The product used was minimum 99.0% pure and had a molar mass of 105.99 g/mol. It contained 58.5% of $Na_2O$;
6. a powder sodium chloride (NaCl) distributed by Sigma-Aldrich. The product used was pure and had a molar mass of 58.44 g/mol. It contained 53.0% of $Na_2O$; and
7. a powder sodium nitrate ($NaNO_3$) distributed by VWR-Prolabo. The product used was minimum 99.5% pure. It contained 36.5% of $Na_2O$.

Admixture:
the products used in the examples were the following:
Plasticizer <<Chrysoplast 209>> from Chryso, which was the lignosulfonate type used in liquid form and having a dry extract of 34.4% and a density of 1.15;
Plasticizer <<Prelom 300>> from BASF, which was the polycarboxylate type used in liquid form and having a dry extract of 13.7% and a density of 1.03.

Aggregates:
the materials in the following list were used:
Honfleur sand with a maximum diameter less than or equal to 4 mm (0/4R) (alluvial river sand; supplier: Lafarge);

St Bonnet sand with a maximum diameter less than or equal to 5 mm (0/5R) (alluvial river sand; supplier: Jean Lefebvre);

Aggregates with a maximum diameter of 6.3 to 10 mm (6.3/10) from Cassis (crushed fine gravel; supplier: Lafarge).

Example 1
Concrete Formulations According to the Invention

The following formulae are formulae of concrete compositions according to the invention, except formula C25/30 which is a control and except for formulae FA1-3 and FA 4-3.

The materials used are those described herein above. Each number corresponds to the mass of material used (in kg) to prepare 1 m³ of concrete, except for the water which is given in liters for 1 m³ of concrete.

Formula C25/30 (Control)

| | |
|---|---|
| Cassis aggregates 6.3/10C | 900 |
| Honfleur sand 0/4R | 900 |
| CEM I 52.5 N HTS cement from Le Teil | 257 |
| BL200 Filler | 95 |
| CHRYSOPLAST 209 admixture | 0.54 |
| Total water | 189 |
| Effective water ($W_{eff}$) | 173 |

FA1: First Series of Tests with the Fly Ash from Le Havre:

| Number of the batch | FA1-0 | FA1-1 | FA1-2 | FA1-3 | FA1-4 |
|---|---|---|---|---|---|
| St Bonnet 0/5R | 920.0 | 920.0 | 920.0 | 920.0 | 920.0 |
| Cassis 6.3/10C | 920.0 | 920.0 | 920.0 | 920.0 | 920.0 |
| Micronised SPLC dv97 = 16 µm | 120.0 | 120.0 | 120.0 | 120.0 | 120.0 |
| Mazan Anhydrite | 8.89 | 8.89 | 8.89 | 1.19 | 1.19 |
| BL200 LIMESTONE FILLER | 29.6 | 29.6 | 29.6 | 29.6 | 29.6 |
| FA Le Havre | 151.1 | 137.4 | 123.8 | 152.0 | 138.3 |
| $W_{eff}$ | 165.1 | 165.1 | 165.1 | 165.1 | 165.1 |
| Prelom 300 | 3.38 | 3.38 | 3.38 | 3.38 | 3.38 |
| $Na_2SO_4$ | 0.00 | 13.67 | 27.34 | 6.84 | 20.51 |
| $Na_2Oeq/FA$ (mass %) | 2.27% | 6.68% | 12.06% | 4.23% | 8.80% |
| $SO_3$/Clinker (mass %) | 8.01% | 14.35% | 20.68% | 7.89% | 14.23% |

FA2: Second Series of Tests with the Fly Ash from Popiol:

| Number of the batch | FA2-0 | FA2-1 | FA2-2 | FA2-3 |
|---|---|---|---|---|
| St Bonnet 0/5R | 920.0 | 920.0 | 920.0 | 920.0 |
| Cassis 6.3/10C | 920.0 | 920.0 | 920.0 | 920.0 |
| Micronised SPLC dv97 = 16 µm | 120.0 | 120.0 | 120.0 | 120.0 |
| Mazan Anhydrite | 8.56 | 8.56 | 8.56 | 1.15 |
| BL200 LIMESTONE FILLER | 18.3 | 18.3 | 18.3 | 18.3 |
| FA Popiol | 151.4 | 138.4 | 123.8 | 139.3 |
| $W_{eff}$ | 165.1 | 165.1 | 165.1 | 165.1 |
| Prelom 300 | 3.26 | 3.26 | 3.26 | 3.26 |
| $Na_2SO_4$ | 0.00 | 13.03 | 26.05 | 19.54 |
| $Na_2Oeq/FA$ (mass %) | 3.61% | 7.78% | 12.95% | 9.79% |
| $SO_3$/Clinker (mass %) | 7.85% | 13.89% | 19.91% | 13.74% |

FA3: Third Series of Tests with the Fly Ash from Sundance:

| Number of the batch | FA3-0 | FA3-1 | FA3-2 | FA3-3 | FA3-4 |
|---|---|---|---|---|---|
| St Bonnet 0/5R | 920.0 | 920.0 | 920.0 | 920.0 | 920.0 |
| Cassis 6.3/10C | 920.0 | 920.0 | 920.0 | 920.0 | 920.0 |
| Micronised SPLC dv97 = 16 µm | 120.0 | 120.0 | 120.0 | 120.0 | 120.0 |
| Mazan Anhydrite | 8.32 | 8.32 | 8.32 | 1.11 | 1.11 |
| BL200 LIMESTONE FILLER | 9.7 | 9.7 | 9.7 | 9.7 | 9.7 |
| FA Sundance | 151.7 | 138.6 | 125.6 | 152.4 | 139.3 |
| $W_{eff}$ | 165.1 | 165.1 | 165.1 | 165.1 | 165.1 |
| Prelom 300 | 0.63 | 0.63 | 0.63 | 0.63 | 0.63 |
| $Na_2SO_4$ | 0.00 | 13.07 | 26.13 | 6.53 | 19.60 |
| $Na_2Oeq/FA$ (mass %) | 4.35% | 8.53% | 13.57% | 6.21% | 10.55% |
| $SO_3$/Clinker (mass %) | 7.09% | 13.20% | 19.31% | 7.03% | 13.15% |

FA 4: Fourth Series of Tests with the Fly Ash from TES:

| Number of the batch | FA4-0 | FA4-1 | FA4-2 | FA4-3 | FA4-4 |
|---|---|---|---|---|---|
| St Bonnet 0/5R | 920.0 | 920.0 | 920.0 | 920.0 | 920.0 |
| Cassis 6.3/10C | 920.0 | 920.0 | 920.0 | 920.0 | 920.0 |
| Micronised SPLC dv97 = 16 μm | 120.0 | 120.0 | 120.0 | 120.0 | 120.0 |
| Mazan Anhydrite | 8.62 | 8.62 | 8.62 | 1.15 | 1.15 |
| BL200 LIMESTONE FILLER | 20.1 | 20.1 | 20.1 | 20.1 | 20.1 |
| FA TES | 151.4 | 139.2 | 126.9 | 152.7 | 140.5 |
| $W_{eff}$ | 165.1 | 165.1 | 165.1 | 165.1 | 165.1 |
| Prelom 300 | 3.06 | 3.06 | 3.06 | 3.06 | 3.06 |
| $Na_2SO_4$ | 0.00 | 12.23 | 24.46 | 6.12 | 18.35 |
| $Na_2Oeq$/FA (mass %) | 3.16% | 7.06% | 11.70% | 4.90% | 8.91% |
| $SO_3$/Clinker (mass %) | 8.95% | 14.53% | 20.11% | 8.60% | 14.18% |

Performances of the Concretes According to the Invention

The performances of the concretes according to the invention were evaluated for the following characteristics: compressive strength and rheology.

The compressive strength was measured by producing cylindrical specimens of diameter 70, 110 or 160 mm and slenderness ratio of 2, correcting these according to the NF P18-406 Standard, then putting them under stress until failure. With regard to the application of the load, the protocol consisted of surrounding each sample with two or three thicknesses of cellophane wrap, centring it on the bottom plate of a press using a centring template (loading-control mechanical testing machine of 3000 kN capacity, according to the NF P18-411 and 412 Standards), setting the loading control at 1 MPa/s, applying stress until failure according to the NF P18-406 Standard and recording the stress value at failure. Subsequently the strength value was deducted by dividing the force by the section of the specimen.

The target specifications was an arithmetic average of compressive strengths greater than or equal to 6 MPa at 24 hours and greater than 30 MPa at 28 days.

All the results of the compressive strength measurements corresponded to the arithmetic average for three individual measurements of compressive strength.

The result of the compressive strength measurements are recorded in Table 1 below. It is noted that for the four tested fly ash, without the addition of an activator (FA1-0, FA2-0, FA3-0 and FA4-0 formulations), the 28-day strength did not meet the specifications. The 28-day compressive strengths of the formulations without activators were indeed respectively 23.3 MPa, 23.0 MPa, 28.7 MPa and 25.3 MPa. In contrast, once an activator was used and the quantity of equivalent $Na_2O$ in the formulation was greater than or equal to 5% by mass percentage relative to the mass of fly ash, the 28-day strengths significantly improved and met the specifications. The 28-day compressive strengths of the formulations according to the invention were comprised from 31.1 MPa for the FA2-1 formulation to 39.6 MPa for the FA3-2 formulation. These strengths increased with the dosage of activator until reaching an optimum.

In view of increasing the performances of the compositions according to the invention even more, the person skilled in the art could do simple routine tests to find the optimum dosages of the different constituents.

On the other hand, the FA1-3 and FA4-3 formulations were not formulations according to the invention. The quantity of equivalent $Na_2O$ in these formulations was indeed less than 5% by mass percentage relative to the mass of fly ash. It can be noted for these formulations that the 28-day compressive mechanical strengths were less than 30 MPa (respectively 28.6 MPa for the FA1-3 formulation and 29.1 MPa the FA4-3 formulation). The addition of an activator is therefore not a sufficient condition to reach the announced performances. It is necessary that the quantity of equivalent $Na_2O$ in the formulation be greater than or equal to 5% by mass percentage relative to the mass of fly ash.

TABLE 1 compressive strengths ($S_c$ on MPa)
up to 28 days measured on a cylinder with a 70 mm diameter.

| Number of the batch | C25/30 control | FA1-0 | FA1-1 | FA1-2 | FA1-3 | FA1-4 |
|---|---|---|---|---|---|---|
| $S_c$ 24 hours (MPa) | 9.8 | 6.3 | 8.0 | 7.8 | 10.1 | 12.2 |
| $S_c$ 28 days (MPa) | 32.2 | 23.3 | 33.2 | 32.7 | 28.6 | 34.5 |

| Number of the batch | C25/30 control | FA2-0 | FA2-1 | FA2-2 | FA2-3 |
|---|---|---|---|---|---|
| $S_c$ 24 hours (MPa) | 9.8 | 6.0 | 7.7 | 7.4 | 11.3 |
| $S_c$ 28 days (MPa) | 32.2 | 23.0 | 31.1 | 31.5 | 32.3 |

| Number of the batch | C25/30 control | FA3-0 | FA3-1 | FA3-2 | FA3-3 | FA3-4 |
|---|---|---|---|---|---|---|
| $S_c$ 24 hours (MPa) | 9.8 | 6.5 | 7.6 | 7.8 | 9.9 | 11.7 |
| $S_c$ 28 days (MPa) | 32.2 | 28.7 | 36.0 | 39.6 | 32.5 | 37.9 |

| Number of the batch | C25/30 control | FA4-0 | FA4-1 | FA4-2 | FA4-3 | FA4-4 |
|---|---|---|---|---|---|---|
| $S_c$ 24 hours (MPa) | 9.8 | 5.5 | 7.2 | 7.5 | 9.8 | 11.6 |
| $S_c$ 28 days (MPa) | 32.2 | 25.3 | 35.3 | 36.2 | 29.1 | 35.7 |

The rheology of the above concrete compositions was also evaluated. For this, a "static" and "vibrated" measurement of the spread was carried out as follows:

The ASTM cone described in the ASTM C230 Standard was used. The cone was positioned on a vibrating electromagnetic SINEX TS100 table equipped with a square platen, 600 mm×600 mm (frequency 50 Hz, amplitude 0.5 mm). The spread measurement was carried out on a dry surface. The spread was measured in three directions, the average value, rounded to the nearest 5 mm was recorded.

Preparation: two liters of dry mix were introduced into the tank; this was mixed for 30 seconds at low speed; the mixer was stopped; the total quantity of water and liquid admixture were introduced; mixing was carried out for two minutes at low speed. At the end of the mixing, that is, two minutes after contact with the water (T=2 min), the cone was filled in one go and levelled, then the cone was lifted.

At T=3 min, the "static" spread was measured after waiting one minute.

At T=3 min 15, vibration was started at 50 Hz and 0.5 mm amplitude for 30 seconds.

At T=3 min 45, the "vibrated" spread was measured.

The results are given in Table 2 below. They show that the concretes formulated according to the invention had good performances in terms of rheology, even just as good as those of a standard C25/30 concrete. The vibrated spread of the control concrete (C25/30) was indeed 225 mm, and the vibrated spread of the formulations according to the invention was comprised from 203 mm for the FA1-1 formulation to 228 mm for the FAV3-4 formulation.

TABLE 2 rheological performance (spreads are given in mm)

| Number of the batch | C25/30 control | FA1-0 | FA1-1 | FA1-2 | FA1-3 | FA1-4 |
|---|---|---|---|---|---|---|
| Vibrated spread (mm) | 225 | 228 | 203 | 205 | 213 | 210 |

| Number of the batch | C25/30 control | FA2-0 | FA2-1 | FA2-2 | FA2-3 | |
|---|---|---|---|---|---|---|
| Vibrated spread (mm) | 225 | 229 | 209 | 210 | 210 | |

| Number of the batch | C25/30 control | FA3-0 | FA3-1 | FA3-2 | FA3-3 | FA3-4 |
|---|---|---|---|---|---|---|
| Vibrated spread (mm) | 225 | 220 | 224 | 225 | 227 | 228 |

| Number of the batch | C25/30 control | FA4-0 | FA4-1 | FA4-2 | FA4-3 | FA4-4 |
|---|---|---|---|---|---|---|
| Vibrated spread (mm) | 225 | 235 | 210 | 213 | 225 | 215 |

Example 2

Comparison of Different Activators—C20/25 Type of Formula

The first three following tables (Activators 1 to 3) were formulations of the C20/25 type according to the invention, except the A0 formulation which was a control without an activator. The four following tables (Activators 4 to 7) were comparative examples with other activators than those used according to the invention. The materials used were those described herein above in the first part of the examples. Each number corresponded to the mass of material used (in kg) to prepare 1 m³ of concrete. The dosage of plasticizer (Prelom 300) was adjusted to each formula in order to be within the rheological target: vibrated spread greater than or equal to 210 mm.

Activator 1 - sodium sulphate ($Na_2SO_4$)

| Number of the batch | A0 | A1-1 | A1-2 | A1-3 |
|---|---|---|---|---|
| St Bonnet 0/5R | 920 | 920 | 920 | 920 |
| Cassis 6.3/10C | 920 | 920 | 920 | 920 |
| Micronised SPLC dv97 = 19 μm | 120 | 120 | 120 | 120 |
| Mazan Anhydrite | 0 | 0 | 0 | 0 |
| BL200 LIMESTONE FILLERS | 29.6 | 29.6 | 29.6 | 29.6 |
| FA Le Havre | 160 | 150 | 140 | 130 |
| $W_{eff}$ | 163.1 | 163.1 | 163.1 | 163.1 |
| Prelom 300 | 4.06 | 5.64 | 7.45 | 9.03 |
| $Na_2SO_4$ | 0 | 10 | 20 | 30 |
| $Na_2Oeq/FA$ (mass %) | 2.2% | 5.1% | 8.5% | 12.4% |
| $SO_3$/Clinker (mass %) | 3.0% | 6.4% | 9.8% | 13.2% |

Activator 2 - lithium sulphate ($Li_2SO_4$)

| Number of the batch | A0 | A2-1 | A2-2 | A3-3 |
|---|---|---|---|---|
| St Bonnet 0/5R | 920 | 920 | 920 | 920 |
| Cassis 6.3/10C | 920 | 920 | 920 | 920 |
| SPLC dv97 = 19 μm | 120 | 120 | 120 | 120 |
| Mazan Anhydrite | 0 | 0 | 0 | 0 |
| BL200 LIMESTONE FILLERS | 29.6 | 29.6 | 29.6 | 29.6 |
| FA Le Havre | 160 | 152.2 | 144.4 | 136.7 |
| $W_{eff}$ | 163.1 | 163.1 | 163.1 | 163.1 |
| Prelom 300 | 4.06 | 5.64 | 6.77 | 9.03 |
| $Li_2SO_4$ | 0 | 7.8 | 15.6 | 23.3 |
| $Na_2Oeq/FA$ (mass %) | 2.2% | 5.1% | 8.3% | 11.9% |
| $SO_3$/Clinker (mass %) | 3.0% | 6.4% | 9.9% | 13.3% |

Activator 3 - potassium sulphate ($K_2SO_4$)

| Number of the batch | A0 | A3-1 |
|---|---|---|
| St Bonnet 0/5R | 920 | 920 |
| Cassis 6.3/10C | 920 | 920 |
| SPLC dv97 = 19 μm | 120 | 120 |
| Mazan Anhydrite | 0 | 0 |
| BL200 LIMESTONE FILLERS | 29.6 | 29.6 |
| FA Le Havre | 160 | 147.8 |
| $W_{eff}$ | 163.1 | 163.1 |
| Prelom 300 | 4.06 | 6.77 |
| $K_2SO_4$ | 0 | 12.25 |
| $Na_2Oeq/FA$ (mass %) | 2.2% | 5.2% |
| $SO_3$/Clinker (mass %) | 3.0% | 6.4% |

Activator 4 - lithium hydroxide ($LiOH \cdot H_2O$)

| Number of the batch | A0 | A4-1 |
|---|---|---|
| St Bonnet 0/5R | 920 | 920 |
| Cassis 6.3/10C | 920 | 920 |
| SPLC dv97 = 19 μm | 120 | 120 |
| Mazan Anhydrite | 0 | 0 |
| BL200 LIMESTONE FILLERS | 29.6 | 29.6 |
| FA Le Havre | 160 | 154.1 |
| $W_{eff}$ | 163.1 | 163.1 |
| Prelom 300 | 4.06 | 6.77 |
| $LiOH \cdot H_2O$ | 0 | 5.95 |
| $Na_2Oeq/FA$ (mass %) | 2.2% | 5.0% |
| $SO_3$/Clinker (mass %) | 3.0% | 3.0% |

| Activator 5 - sodium carbonate (Na₂CO₃) | | |
|---|---|---|
| Number of the batch | A0 | A5-1 |
| St Bonnet 0/5R | 920 | 920 |
| Cassis 6.3/10C | 920 | 920 |
| SPLC dv97 = 19 μm | 120 | 120 |
| Mazan Anhydrite | 0 | 0 |
| BL200 LIMESTONE FILLERS | 29.6 | 29.6 |
| FA Le Havre | 160 | 156.3 |
| $W_{eff}$ | 163.1 | 163.1 |
| Prelom 300 | 4.06 | 6.32 |
| Na₂CO₃ | 0 | 3.73 |
| Na₂Oeq/FA (mass %) | 2.2% | 3.6% |
| SO₃/Clinker (mass %) | 3.0% | 3.0% |

| Activator 6 - sodium chloride (NaCl) | | | | |
|---|---|---|---|---|
| Number of the batch | A0 | A6-1 | A6-2 | A6-3 |
| St Bonnet 0/5R | 920 | 920 | 920 | 920 |
| Cassis 6.3/10C | 920 | 920 | 920 | 920 |
| SPLC dv97 = 19 μm | 120 | 120 | 120 | 120 |
| Mazan Anhydrite | 0 | 0 | 0 | 0 |
| BL200 LIMESTONE FILLERS | 29.6 | 29.6 | 29.6 | 29.6 |
| FA Le Havre | 160 | 155.9 | 143.5 | 135.35 |
| $W_{eff}$ | 163.1 | 163.1 | 163.1 | 163.1 |
| Prelom 300 | 4.06 | 4.51 | 3.61 | 3.16 |
| NaCl | 0 | 8.25 | 16.5 | 24.65 |
| Na₂Oeq/FA (mass %) | 2.2% | 5.0% | 8.3% | 11.9% |
| SO₃/Clinker (mass %) | 3.0% | 3.0% | 2.9% | 2.9% |

| Activator 7 - sodium nitrate (NaNO₃) | | | | |
|---|---|---|---|---|
| Number of the batch | A0 | A7-1 | A7-2 | A7-3 |
| St Bonnet 0/5R | 920 | 920 | 920 | 920 |
| Cassis 6.3/10C | 920 | 920 | 920 | 920 |
| SPLC dv97 = 19 μm | 120 | 120 | 120 | 120 |
| Mazan Anhydrite | 0 | 0 | 0 | 0 |
| BL200 LIMESTONE FILLERS | 29.6 | 29.6 | 29.6 | 29.6 |
| FA Le Havre | 160 | 148 | 136 | 124.15 |
| $W_{eff}$ | 163.1 | 163.1 | 163.1 | 163.1 |
| Prelom 300 | 4.06 | 6.32 | 5.64 | 3.38 |
| NaNO₃ | 0 | 12 | 24 | 35.85 |
| Na₂Oeq/FA (mass %) | 2.2% | 5.2% | 8.7% | 12.9% |
| % SO₃/Clinker (mass %) | 3.0% | 2.9% | 2.9% | 2.8% |

The performance of the formulations presented herein above was evaluated according to the same protocol as the one in example 1 herein above.

The target specification was an average compressive strength greater than or equal to 25 MPa at 28 days.

Figure 1:
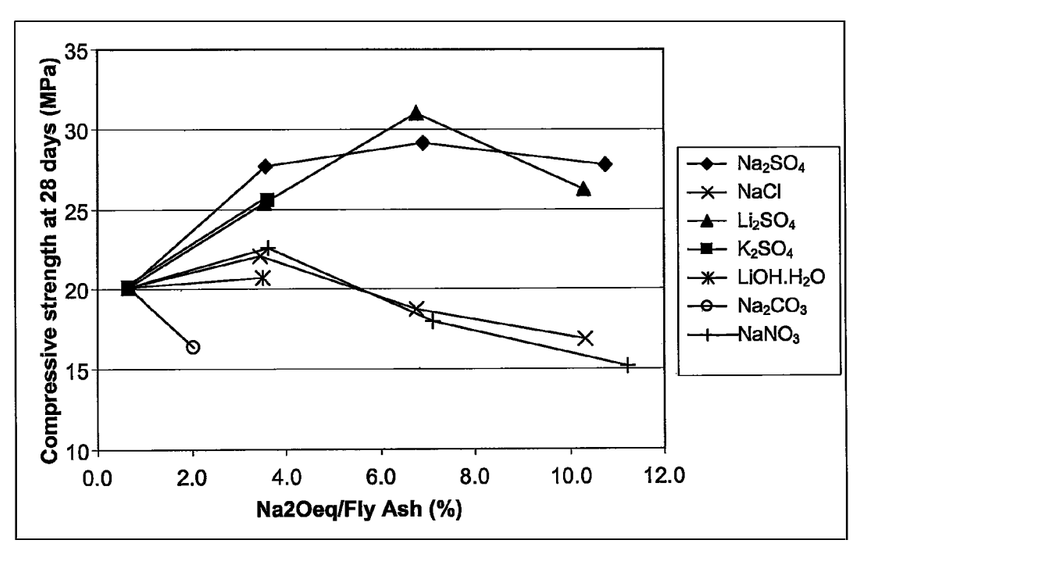

The result of the compressive strength measurements is recorded in Table 3 herein below as well as on FIG. 1.

TABLE 3 compressive strengths (in MPa) at 28 days measured on a cylinder with a 70 mm diameter.

| Activator 1 - sodium sulphate (Na₂SO₄) | | | | |
|---|---|---|---|---|
| Number of the batch | A0 | A1-1 | A1-2 | A1-3 |
| 28-day $S_c$ | 20.1 | 27.7 | 29.1 | 27.8 |

| Activator 2 - lithium sulphate (Li₂SO₄) | | | | |
|---|---|---|---|---|
| Number of the batch | A0 | A2-1 | A2-2 | A2-3 |
| 28-day $S_c$ | 20.1 | 25.4 | 31.0 | 26.2 |

| Activator 3 - potassium sulphate (K₂SO₄) | | |
|---|---|---|
| Number of the batch | A0 | A3-1 |
| 28-day $S_c$ | 20.1 | 25.6 |

| Activator 4 - lithium hydroxide (LiOH•H₂O) | | |
|---|---|---|
| Number of the batch | A0 | A4-1 |
| 28-day $S_c$ | 20.1 | 20.7 |

| Activator 5 - sodium carbonate (Na₂CO₃) | | |
|---|---|---|
| Number of the batch | A0 | A5-1 |
| 28-day $S_c$ | 20.1 | 16.4 |

| Activator 6 - sodium chloride (NaCl) | | | | |
|---|---|---|---|---|
| Number of the batch | A0 | A6-1 | A6-2 | A6-3 |
| 28-day $S_c$ | 20.1 | 22.1 | 18.8 | 16.9 |

| Activator 7 - sodium nitrate (NaNO₃) | | | | |
|---|---|---|---|---|
| Number of the batch | A0 | A7-1 | A7-2 | A7-3 |
| 28-day $S_c$ | 20.1 | 22.6 | 18 | 15.2 |

The results show that:
- the batch not containing an activator (A0) had an insufficient compressive strength at 28 days of 20.1 MPa.
- the addition of alkali sulphates such as Na₂SO₄, Li₂SO₄ or K₂SO₄, at a level greater than 5% by mass of Na₂Oeq relative to the mass of fly ash, made it possible to considerably improve the 28-day strengths.
- indeed, the addition of sodium sulphate resulting in a level of 5.1% of Na₂Oeq relative to the mass of fly ash made it possible to increase the 28-day compressive strength from 20.1 MPa to 27.7 MPa. When the dosage of sodium sulphate resulted in a level of 8.5% of Na₂Oeq relative to the mass of fly ash, the 28-day compressive strength reached 29.1 MPa. For a dosage of sodium sulphate resulting in a level of 12.4% of Na₂Oeq relative to the mass of the fly ash, the 28-day compressive strength was slightly less than the compressive strength obtained with 8.5%, and reached 27.8 MPa. There is therefore an optimum level of the quantity of sodium sulphate.
- on the other hand, the addition of lithium sulphate resulting in a level of 5.1% of Na₂Oeq relative to the mass of fly ash made it possible to increase the 28-day compressive strength from 20.1 MPa to 25.4 MPa. When the dosage of lithium sulphate resulted in a level of 8.3% of Na₂Oeq relative to the mass of fly ash, the 28-day compressive strength reached 31.0 MPa. For a dosage of lithium sulphate resulting in a level of 11.9% of Na₂Oeq relative to the mass of fly ash, the 28-day compressive strength was slightly less than the compressive strength obtained with 8.3%, and reached 26.2 MPa. There is therefore an optimum level of the quantity of lithium sulphate.

in other respects, the addition of potassium sulphate resulting in a level of 5.2% of Na$_2$Oéq relative to the mass of fly ash made it possible to increase the 28-day compressive strength from 20.1 MPa to 25.6 MPa.

in contrast, the addition of lithium hydroxide resulting in a level of 5.0% of Na$_2$Oeq relative to the mass of fly ash had a very limited effect on the 28-day compressive strength, which increased from 20.1 MPa to 20.7 MPa. It was not possible to increase the dosage of lithium hydroxide. Beyond the tested dosage, the rheological performances were too degraded and could no longer be compensated by an increase of the dosage of plasticizer (Prelom 300).

likewise, the addition of sodium carbonate resulting in a level of 3.6% of Na$_2$Oeq relative to the mass of fly ash resulted in a loss of compressive strength at 28 days, which dropped from 20.1 MPa to 16.4 MPa. It was not possible to use the sodium carbonate in order to exceed the threshold of 5.0% of Na$_2$Oeq relative to the mass of fly ash, the rheological performance being too degraded and could no longer be compensated by an increase of the dosage of plasticizer (Prelom 300).

similarly, the addition of sodium chloride resulting in a level of 5.0% of Na$_2$Oeq relative to the mass of fly ash had a very limited effect on the compressive strength at 28 days, which increased from 20.1 MPa to 22.1 MPa. When the dosage of sodium chloride increases, the strengths drop and go below those of the formula without an activator.

likewise, the addition of sodium nitrate resulting in a level of 5.2% of Na$_2$Oeq relative to the mass of fly ash had a very limited effect on the compressive strength at 28 days, which increased from 20.1 MPa to 22.6 MPa. When the dosage of sodium nitrate increases, the strengths drop and go below those of the formula without an activator.

To conclude, the alkali sulphates were the only tested activators making it possible to meet the specifications of an average compressive strength greater than or equal to 25 MPa at 28 days.

The invention claimed is:

1. A dry binder premix comprising, in mass proportions:
   Portland clinker having a Blaine specific surface area comprised from 4500 to 9500 cm$^2$/g, a minimum quantity of said clinker by mass percentage relative to the total mass of the premix being determined according to the following formula (I):

$$[-6.10^{-3} \times BSS_k] + 75 \qquad \text{Formula (I)}$$

in which $BSS_k$ is the Blaine specific surface area of the clinker given in cm$^2$/g;
   fly ash, the quantity of clinker+the quantity of fly ash being greater than or equal to 75%, by mass percentage relative to the total mass of the premix;
   at least one alkali sulphate, the quantity of alkali sulphate being such that the quantity of equivalent Na$_2$O in the premix is greater than or equal to 5% by mass percentage relative to the mass of fly ash;
   at least one source of SO$_3$, in a quantity such that the quantity of SO$_3$ in the premix is greater than or equal to 2% by mass percentage relative to the mass of Portland clinker;
   complementary materials having a Dv90 less than or equal to 200 μm selected from the group consisting of limestone powders, calcined shale, metakaolins, siliceous fillers, silica powders, pozzolans, slags, fly ash and mixtures thereof;
   the total quantity of clinker in the premix being less than 60% by mass percentage relative to the total mass of the premix.

2. The premix according to claim 1, further comprising at least one source of calcium.

3. The premix according to claim 1, wherein the alkali sulphate is selected from the group consisting of sodium sulphate, potassium sulphate, lithium sulphate and mixtures thereof.

4. The premix according to claim 1, wherein the alkali sulphate is sodium sulphate.

5. The premix according to claim 2, wherein the source of calcium is selected from the group consisting of calcium salts and mixtures thereof.

6. A dry binder mix comprising, by mass proportions relative to the total mass of the mix:
   at least 10% of the premix according to claim 1; and
   up to 90% of aggregates.

7. A wet concrete composition, comprising from 140 to 220 l/m$^3$ of effective water in combination with:
   at least 10% of the premix according to claim 1; and
   up to 90% of aggregates;
   the mass percentages being given relative to the total dry mass of the composition.

8. A hardened concrete object of the composition according to claim 7.

9. A process for the preparation of a wet concrete composition comprising:
   mixing the mix of claim 6, with 140 to 220 l/m$^3$ of effective water; or
   mixing the premix of claim 1, with aggregates and 140 to 220 l/m$^3$ of effective water.

10. The process for preparation of a wet concrete composition according to claim 9, comprising mixing:
    Portland clinker having a Blaine specific surface area comprised from 4500 to 9500 cm$^2$/g,
    a minimum quantity of said clinker, in kg/m$^3$, being determined according to the following formula (II):

$$[(-0.021 \times BSS_k) + 230] \times (W_{eff} + 140) \qquad \text{Formula (II)}$$

in which $BSS_k$ is the Blaine specific surface area of the clinker given in cm$^2$/g,
    $W_{eff}$ is the quantity of effective water in l/m$^3$;
    fly ash, the quantity of clinker+the quantity of fly ash being greater than or equal to 240 kg/m$^3$;
    at least one alkali sulphate, the quantity of alkali sulphate being such that the quantity of equivalent Na$_2$O in the binder is greater than or equal to 5% by mass percentage relative to the mass of fly ash;
    at least one source of SO$_3$, in a quantity such that the quantity of SO$_3$ in the binder is greater than or equal to 2% by mass percentage relative to the mass of Portland clinker;
    complementary materials having a Dv90 less than or equal to 200 μm selected from the group consisting of limestone powders, calcined shale, metakaolins, siliceous fillers, silica powders, pozzolans, slags, fly ash and mixtures thereof, the minimum quantity of which, in kg/m³, is determined according to the following formula (III):

the sum of (quantity of complementary material)+(quantity of fly ash)+(quantity of clinker)+(quantity of alkali sulphate)+(quantity of a source of $SO_3$) is greater than or equal to 220 kg/m³ of concrete   Formula (III);

from 1500 to 2200 kg/m³ of aggregates;
a plasticizer;
optionally an accelerator and/or an air-entraining agent and/or a thickening agent and/or a retarder and/or a clay-inerting agent; with
140 to 220 l/m³ of effective water,
the total quantity of clinker in the wet concrete being less than or equal to 200 kg/m³.

11. A process for the preparation of a cast wet concrete, comprising:
casting a wet concrete composition according to claim 7.

12. A process for the production of a concrete object, comprising:
hardening of a wet concrete composition according to claim 7.

13. A method comprising activating the fly ash in a premix according to claim 1 using at least one alkali sulphate and optionally at least one source of calcium.

14. A process for the preparation of a cast wet concrete, comprising casting a wet concrete composition obtained according to the process of claim 9.

15. A process for the production of a concrete object, comprising:
hardening of a wet concrete composition obtained according to the process of claim 9.

16. A process for the production of a concrete object, comprising:
hardening of a wet concrete composition cast according to claim 11.

17. The premix according to claim 1, wherein the Blaine specific surface area is comprised from 5500 to 8000 cm²/g.

18. The premix according to claim 1, wherein the quantity of clinker+the quantity of fly ash is greater than or equal to 78% by mass percentage relative to the total mass of the premix.

* * * * *